United States Patent
Nammi et al.

(10) Patent No.: US 9,615,263 B2
(45) Date of Patent: Apr. 4, 2017

(54) METHOD TO IMPROVE THE PERFORMANCE IN CELL RANGE EXPANSION USING LOCATION BASED CODEBOOK SUBSET RESTRICTION

(71) Applicant: Telefonaktiebolaget L M Ericsson (publ), Stockholm (SE)

(72) Inventors: Sairamesh Nammi, Kista (SE); Marius Cismasu, Järfälla (SE); Bo Göransson, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/722,869

(22) Filed: May 27, 2015

(65) Prior Publication Data

US 2016/0353290 A1 Dec. 1, 2016

(51) Int. Cl.
| | | |
|---|---|---|
| H04W 40/00 | (2009.01) | |
| H04W 16/26 | (2009.01) | |
| H04W 4/02 | (2009.01) | |
| H04W 16/32 | (2009.01) | |
| H04W 24/10 | (2009.01) | |
| H04W 64/00 | (2009.01) | |
| H04L 5/00 | (2006.01) | |
| H04B 7/04 | (2017.01) | |
| H04B 7/06 | (2006.01) | |
| H04W 84/04 | (2009.01) | |
| H04W 88/08 | (2009.01) | |

(52) U.S. Cl.
CPC .......... *H04W 16/26* (2013.01); *H04B 7/0478* (2013.01); *H04B 7/0482* (2013.01); *H04B 7/0658* (2013.01); *H04L 5/0073* (2013.01); *H04W 4/021* (2013.01); *H04W 16/32* (2013.01); *H04W 24/10* (2013.01); *H04W 64/003* (2013.01); *H04W 84/042* (2013.01); *H04W 88/08* (2013.01)

(58) Field of Classification Search
CPC ...................................................... H04W 16/26
USPC ........................................................ 455/446
See application file for complete search history.

(56) References Cited

U.S. PATENT DOCUMENTS

| | | | |
|---|---|---|---|
| 2005/0107066 A1* | 5/2005 | Erskine et al. ............... | 455/405 |
| 2009/0325590 A1* | 12/2009 | Liu et al. .................... | 455/452.2 |
| 2011/0111781 A1* | 5/2011 | Chen et al. .................. | 455/507 |
| 2011/0159891 A1* | 6/2011 | Segall et al. ............... | 455/456.3 |

(Continued)

OTHER PUBLICATIONS

Author Unknown, "Technical Specification Group Radio Access Network; Physical layer procedures (FDD) (Release 10)," Technical Specification 25.214, Version 10.8.0, 3GPP Organizational Partners, Mar. 2014, 100 pages.

(Continued)

*Primary Examiner* — Santiago Garcia
(74) *Attorney, Agent, or Firm* — Withrow & Terranova, PLLC

(57) ABSTRACT

Systems and methods are disclosed for providing location-based codebook subset restriction. In some embodiments, location-based codebook subset restriction is provided in such a manner as to mitigate co-channel interference from a macro base station to User Equipment devices (UEs) in a cell range expansion zone of a Low Power Node (LPN) within a coverage area of the macro base station. In this manner, performance of the UEs in the cell range expansion zone is improved.

18 Claims, 28 Drawing Sheets

(56) References Cited

U.S. PATENT DOCUMENTS

| | | | |
|---|---|---|---|
| 2012/0258715 A1* | 10/2012 | Souissi et al. | 455/436 |
| 2013/0114763 A1 | 5/2013 | Park | |
| 2013/0163687 A1 | 6/2013 | Jing et al. | |
| 2014/0016549 A1* | 1/2014 | Novlan | H04B 7/0417 370/328 |
| 2014/0099960 A1* | 4/2014 | Ahmad et al. | 455/438 |
| 2014/0198751 A1* | 7/2014 | Prasad et al. | 370/329 |
| 2015/0098346 A1* | 4/2015 | Guo et al. | 370/252 |
| 2015/0326290 A1* | 11/2015 | Harrison et al. | 370/252 |

OTHER PUBLICATIONS

Author Unknown, "Technical Specification Group Radio Access Network; Evolved Universal Terrestrial Radio Access (E-UTRA); Physical channels and modulation (Release 8)," Technical Specification 36.211, Version 8.9.0, 3GPP Organizational Partners, Dec. 2009, 83 pages.

Author Unknown, "Technical Specification Group Radio Access Network; Evolved Universal Terrestrial Radio Access (E-UTRA); Physical layer procedures (Release 8)," Technical Specification 36.213, Version 8.8.0, 3GPP Organizational Partners, Sep. 2009, 77 pages.

Ericsson, et al., "R1-130622: Cell Range Expansion in Heterogeneous Networks," 3rd Generation Partnership Project (3GPP), TSG RAN WG1 Meeting #72, Jan. 28-Feb. 1, 2013, 6 pages, St. Julian's, Malta.

International Search Report and Written Opinion for International Patent Application No. PCT/IB2016/053105, mailed Jul. 13, 2016, 14 pages.

\* cited by examiner

METHOD TO IMPROVE THE PERFORMANCE IN CELL RANGE EXPANSION USING LOCATION BASED CODEBOOK SUBSET RESTRICTION

TECHNICAL FIELD

The present disclosure relates to cell range expansion and, in particular, improving performance in cell range expansion using location based codebook subset restriction.

BACKGROUND

During the last few years, cellular operators have started to offer mobile broadband based on Wideband Code Division Multiple Access (WCDMA)/High Speed Packet Access (HSPA). Further, fuelled by Long Term Evolution (LTE)/LTE Advanced (LTE-A) deployments and new devices designed for data applications, end user performance requirements are steadily increasing. The large uptake of mobile broadband has resulted in significant growth in the traffic volume that needs to be handled by the HSPA/LTE/LTE-A networks. Therefore, techniques that allow cellular operators to manage their networks more efficiently are of large importance. One such technique is deployment of Low Power Nodes (LPNs) in a coverage area of a macro base station, which may also be referred to herein as a macro node or a high power node. This type of deployment is referred to as a heterogeneous network.

A homogeneous network is a network of base stations (e.g., Node Bs NBs)/enhanced or evolved NBs (eNBs)) in a planned layout and a collection of User Equipment devices (UEs), which may also be referred to herein as user terminals, in which all base stations have similar transmit power levels (typically 43-46 Decibel-milliwatts (dBm)), antenna patterns, receiver noise floors, and similar backhaul connectivity to the data network. Moreover, all base stations offer unrestricted access to UEs in the network, and serve roughly the same number of UEs. Many current deployments of wireless systems fall under this category. For example, many current deployments of Global System for Mobile communications (GSM) networks, WCDMA, High Speed Downlink Packet Access (HSDPA) networks, LTE networks, and WiMax networks are homogeneous networks.

In heterogeneous networks, in addition to the planned or regular placement of macro base stations (referred to as the macro layer), several micro/pico/femto/relay/Remote Radio Unit (RRU) nodes (commonly referred to as LPNs) are deployed. One example of a heterogeneous network 10 is illustrated in FIG. 1. As shown, the heterogeneous network 10 includes a macro base station 12, which may be referred to as a High Power Node (HPN) or macro node, and a number of LPNs 14 within the coverage area of the macro base station 12. Note that the power transmitted by the LPNs 14 is relatively small compared to that of macro base station 12, e.g. 2 Watts (W) as compared to 40 W for a typical macro base station. The LPNs 14 are deployed to eliminate coverage holes in the homogeneous network (i.e., the network using macro base stations only) and to off-load the macro layer, thereby improving the capacity in hot-spot scenarios. Due to the lower transmit power and smaller physical size, a LPN 14 might offer more flexible site acquisitions.

Generally, there are two different types of deployments of a heterogeneous network 10. In a first type of deployment, which is referred to as a co-channel deployment, each LPN 14 has its own cell identity (scrambling code in WCDMA/HSPA), and the LPNs 14 and the macro base station 12 provide different cells (i.e., small cells provided by the LPNs 14 are different than the macro cell provided by the macro base station 12) but the cells typically share the same frequency. In the second type of deployment, which is referred to as a soft or combined cell deployment, the LPNs 14 and the macro base station 12 operate together to provide the same cell (i.e., the small cells provided by the LPNs 14 have the same cell identity as the macro cell provided by the macro base station 12).

FIG. 2 shows one example of co-channel deployment of the heterogeneous network 10. In this example, the macro base station 12 creates a macro cell (cell A), and two LPNs 14 create small cells B and C, respectively. Each individual cell is characterized by individual pilot signals, downlink and uplink control channels, and data traffic channels.

FIG. 3 shows one example of a soft or combined cell deployment of the heterogeneous network 10. In this example, the LPNs 14 are part of the macro cell. This setup avoids the frequent (soft) handovers, and hence higher layer signaling. Note that in this deployment all the nodes are coupled to the central node (in this case the macro node) via a high speed data link.

FIG. 4 shows the average sector throughput in megabits per second (Mbps) versus number of UEs per macro node with four LPNs with 37 dBm and 30 dBm power for WCDMA. It can be seen that, at high load, the co-channel deployment gives significant gains because more users are offloaded. This is referred to herein as gains due to load balancing.

FIG. 5 shows the percentage of gain (with respect to a homogeneous network) achieved with a co-channel deployment of a heterogeneous network. It can be observed that, at low loads, there is almost no gain and that the gain increases as the load increases. The gain depends on the percentage of offloading.

Since the LPNs 14 have less transmit power and hence a smaller coverage area than the macro base station 12, the number of UEs served by the LPNs 14 are less compared to that of the macro base station 12. The gains in the heterogeneous network 10 can be improved if more UEs are offloaded to the LPNs 14. One technique to improve the overall system throughput is cell range expansion where the UEs are offloaded to the LPNs 14 by increasing the Cell Individual Offsets (CIOs) used for handover decisions.

FIG. 6 illustrates one example of cell range expansion. As illustrated, cell range expansion results in a cell range expansion zone 16 around the cell of the LPN 14. In the cell range expansion zone 16, the strongest cell is the macro cell. However, if the LPN 14 is less loaded than the macro cell, UEs within the cell range expansion zone 16 can be served more often by the LPN 14, even though the throughput may be reduced due to the small cell of the LPN 14 not being the strongest cell. Since these UEs get scheduled more often when connected to the LPN 14, the overall throughput is higher.

When in the cell range expansion zone 16, a UE that is connected to the LPN 14 experiences strong interference from the macro base station 12. FIG. 7 shows the link throughput when the UE is connected to the LPN 14 with different macro interference values (Ioc). It can be observed that the performance of the UE is severely impacted when the dominant interferer power is 10 to 20 times that of received power from the LPN 14. It can be observed from above that there is huge performance degradation with the interference. The performance loss is in the range of 100% at high geometries. Hence, even though the UE is offloaded to the LPN 14 when in the cell range expansion zone 16, the individual UE throughput is impacted in the cell range expansion zone 16.

As such, there is a need for systems and methods for improving performance of user terminals in the cell range expansion zone of a LPN in a heterogeneous network.

SUMMARY

Systems and methods are disclosed for providing location-based codebook subset restriction. In some embodiments, location-based codebook subset restriction is provided in such a manner as to mitigate co-channel interference from a macro base station to User Equipment devices (UEs) in a cell range expansion zone of a Low Power Node (LPN) within the coverage area of the macro base station. In this manner, performance of the UEs in the cell range expansion zone is improved.

In some embodiments, a method of operation of a network node in a cellular communications network comprises determining a codebook subset restriction for a wireless device based on a location of the wireless device within a serving cell of the wireless device and sending an indication of the codebook subset restriction to the wireless device.

In some embodiments, determining the codebook subset restriction for the wireless device based on the location of the wireless device within the serving cell of the wireless device comprises determining whether the wireless device is a cell edge wireless device based on the location of the wireless device within the serving cell of the wireless device and, if the wireless device is a cell edge wireless device, selecting a codebook subset restriction that mitigates co-channel interference to other wireless devices as the codebook subset restriction for the wireless device. Further, in some embodiments, the other wireless devices to which the codebook subset restriction mitigates co-channel interference comprise wireless devices in a cell range expansion area of a LPN.

In some embodiments, determining the codebook subset restriction for the wireless device based on the location of the wireless device within the serving cell of the wireless device further comprises using no codebook subset restriction if the wireless device is not a cell edge wireless device.

In some embodiments, the codebook subset restriction that mitigates co-channel interference to other wireless devices is dynamic. In some embodiments, selecting the codebook subset restriction that mitigates co-channel interference to other wireless devices as the codebook subset restriction for the wireless device comprises selecting the codebook subset restriction that mitigates co-channel interference to other wireless devices based on one or more dynamic criteria. In some embodiments, the one or more dynamic criteria comprise at least one of a group consisting of: which transmit antennas are active for downlink transmission in the serving cell of the wireless device and the location of the wireless device within the serving cell of the wireless device.

In some embodiments, the method of operation of the network node further comprises determining the location of the wireless device within the serving cell of the wireless device based on at least one of a group consisting of: measurements from a positioning system, one or more Channel Quality Information (CQI) reports from the wireless device, one or more mobility measurement reports from the wireless device, and a size of a neighbor cell list for the wireless device.

In some embodiments, the cellular communications network is a Long Term Evolution (LTE) network. In other embodiments, the cellular communications network is a High Speed Packet Access (HSPA) network.

In some embodiments, the network node is a base station controlling the serving cell of the wireless device.

Embodiments of a network node providing location-based codebook subset restriction are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
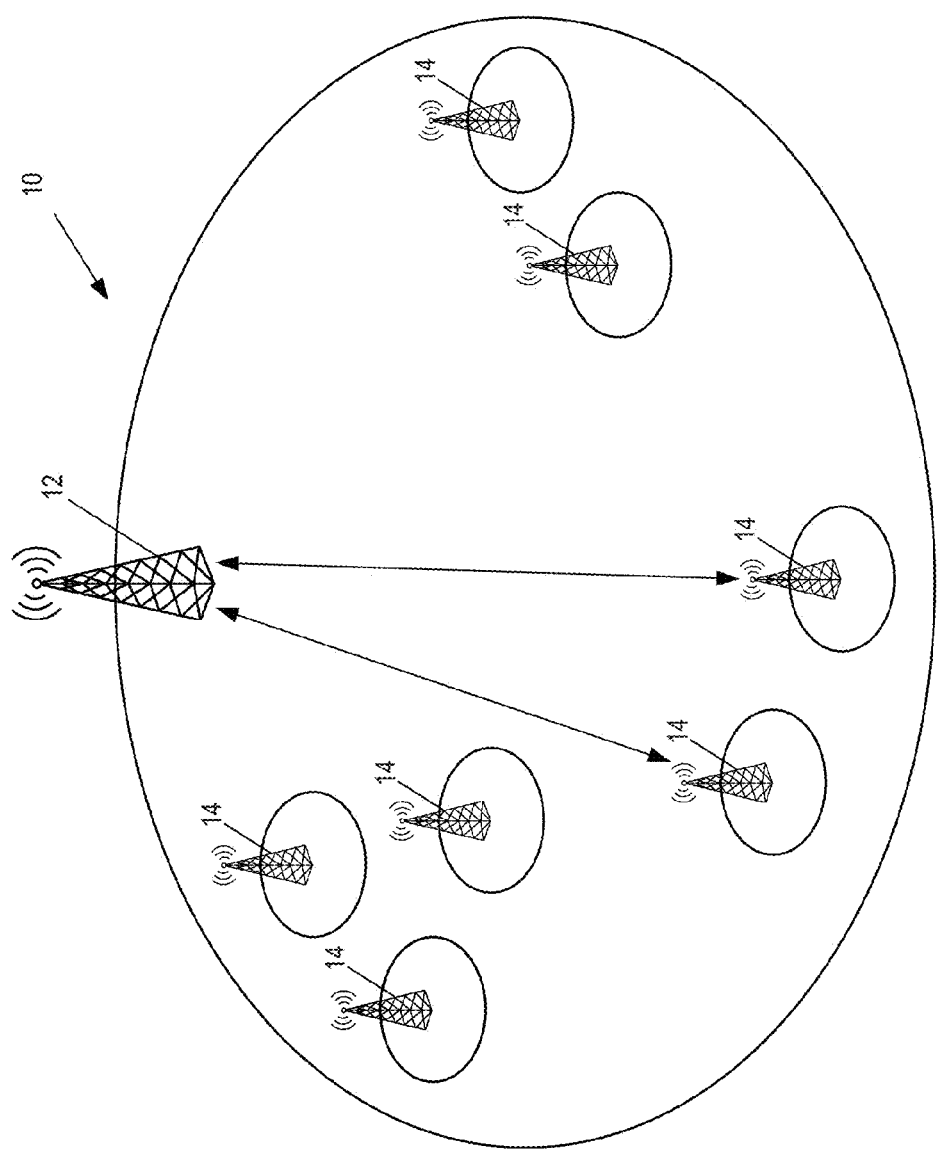
FIG. 1 illustrates a heterogeneous network.
Figure 2:
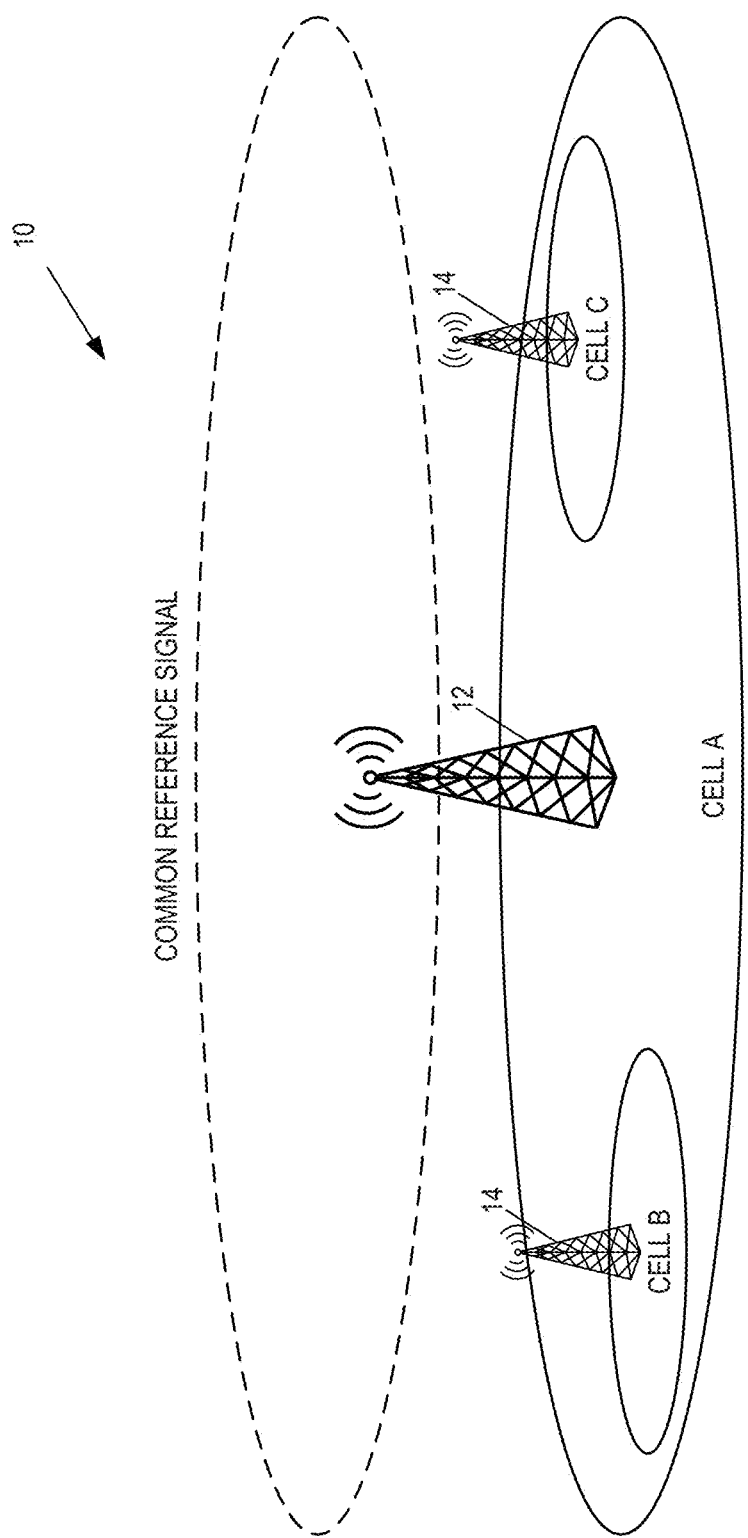
FIG. 2 illustrates a co-channel deployment of a heterogeneous network.
Figure 3:
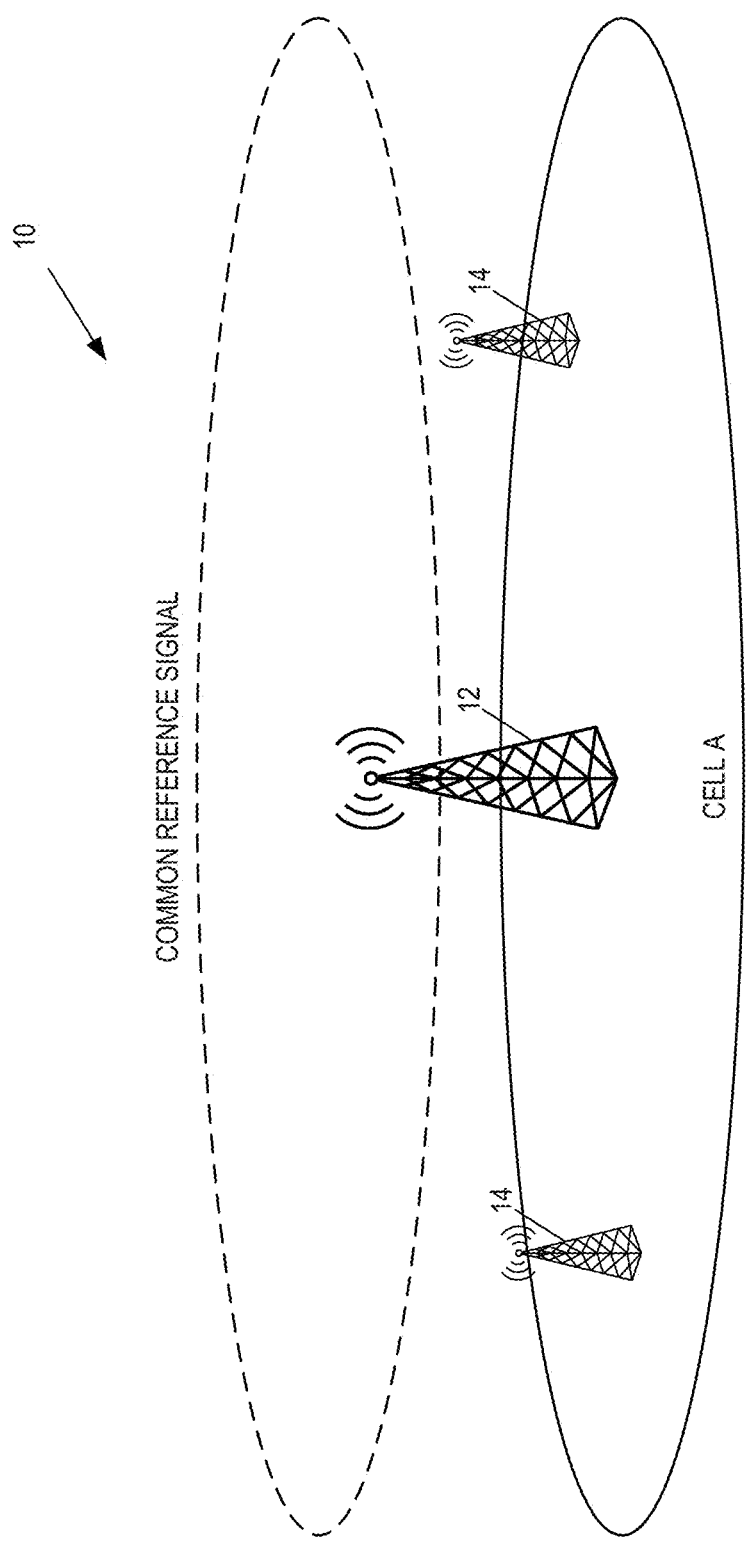
FIG. 3 illustrates a shared cell deployment of a heterogeneous network.
Figure 4:
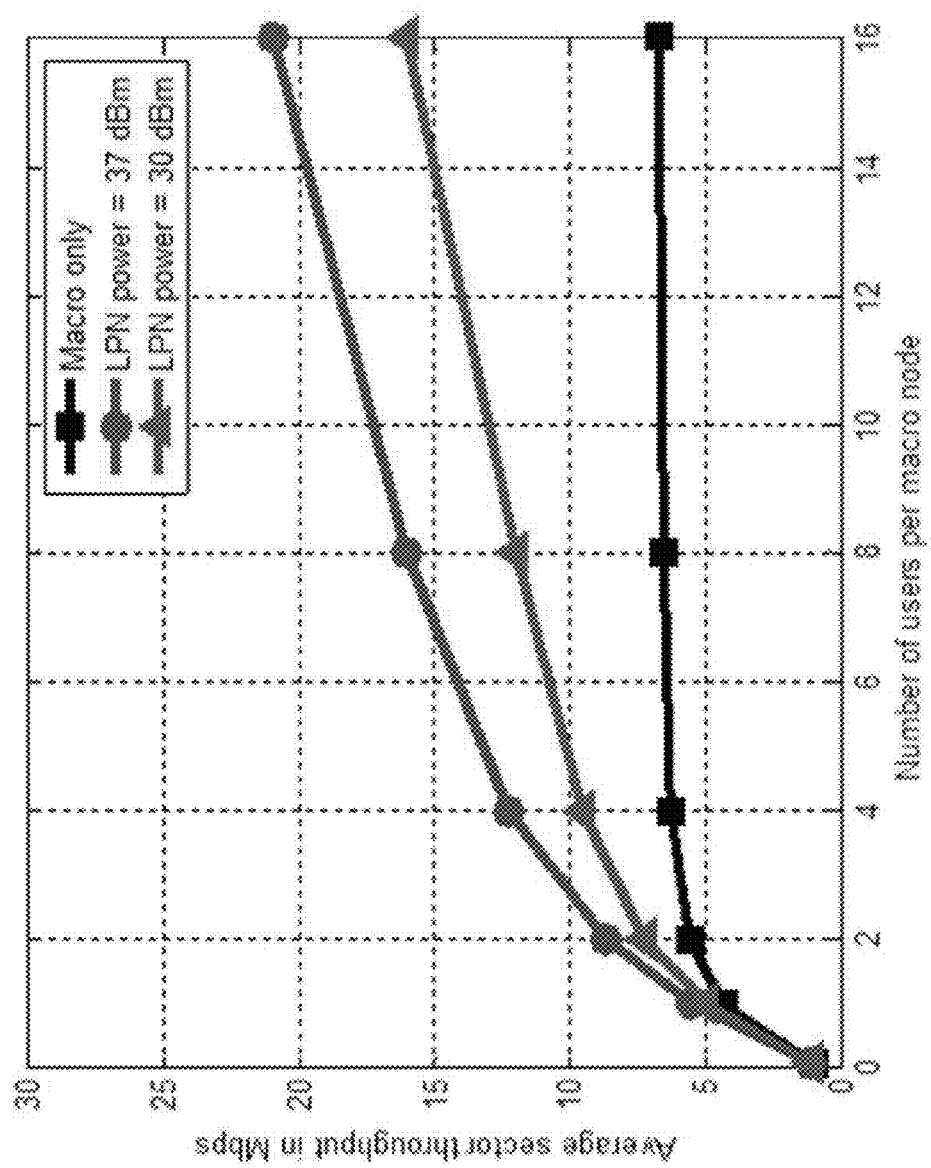
FIG. 4 illustrates average sector throughput versus number of User Equipment devices (UEs) per macro node with four Low Power Nodes (LPNs)
Figure 5:
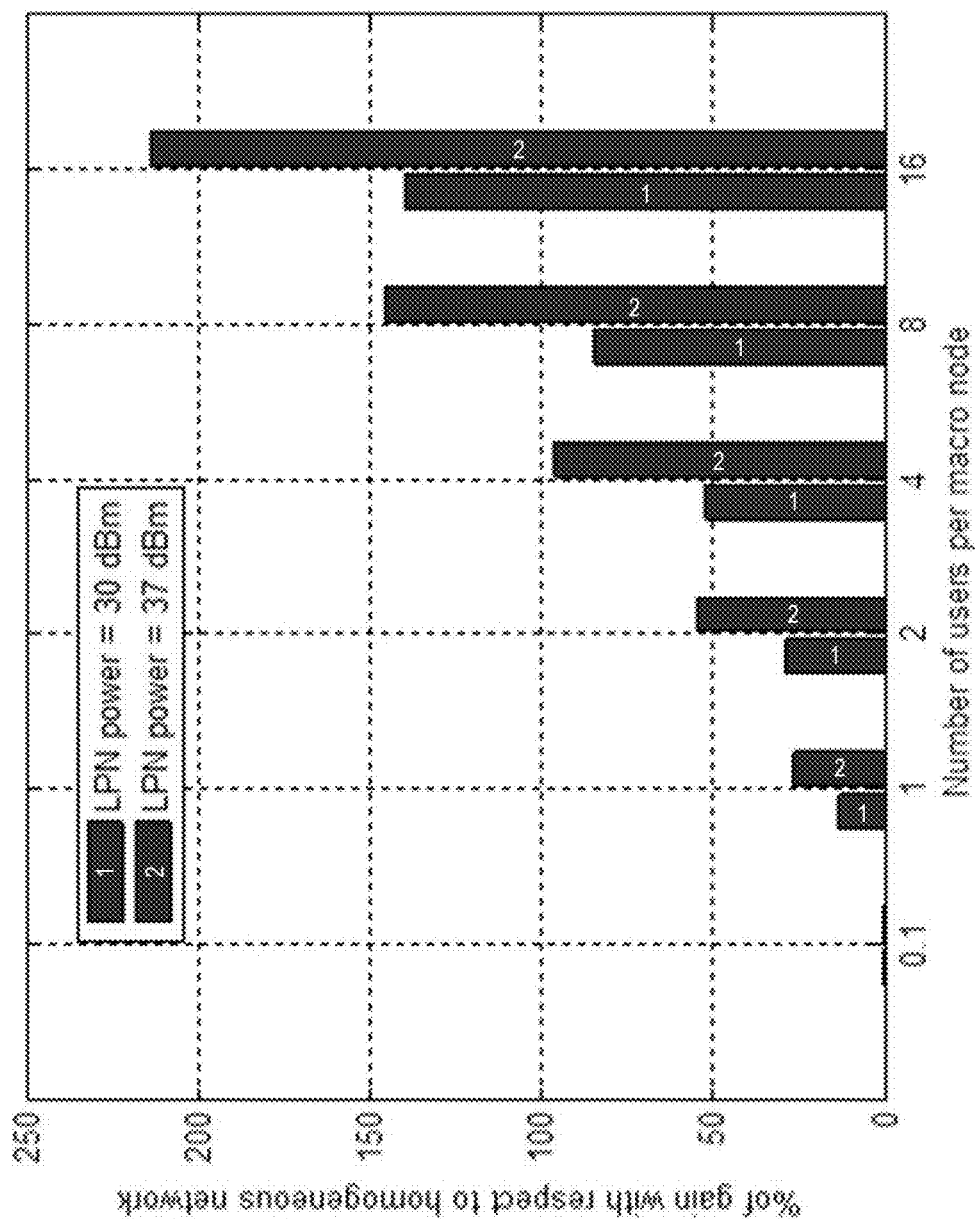
FIG. 5 illustrates percentage of gain (with respect to a homogeneous network) achieved with a co-channel deployment of a heterogeneous network.
Figure 6:
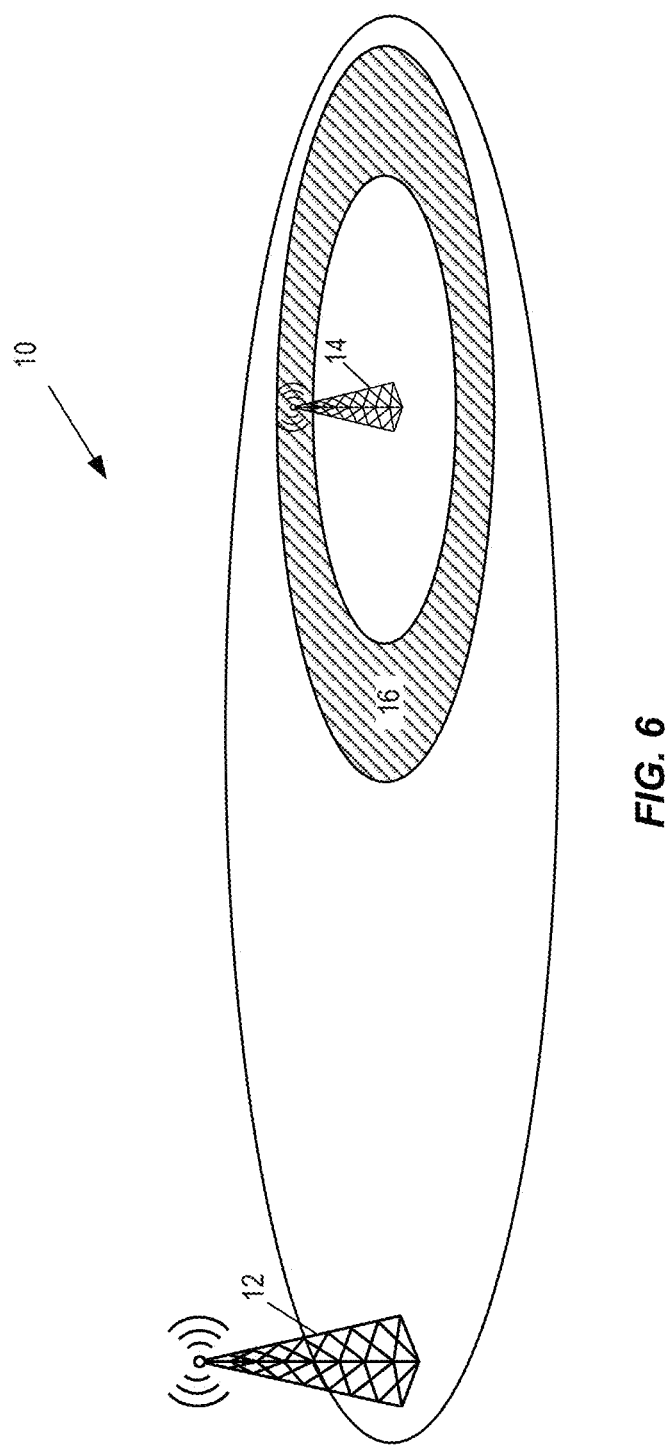
FIG. 6 illustrates one example of cell range expansion.
Figure 7:
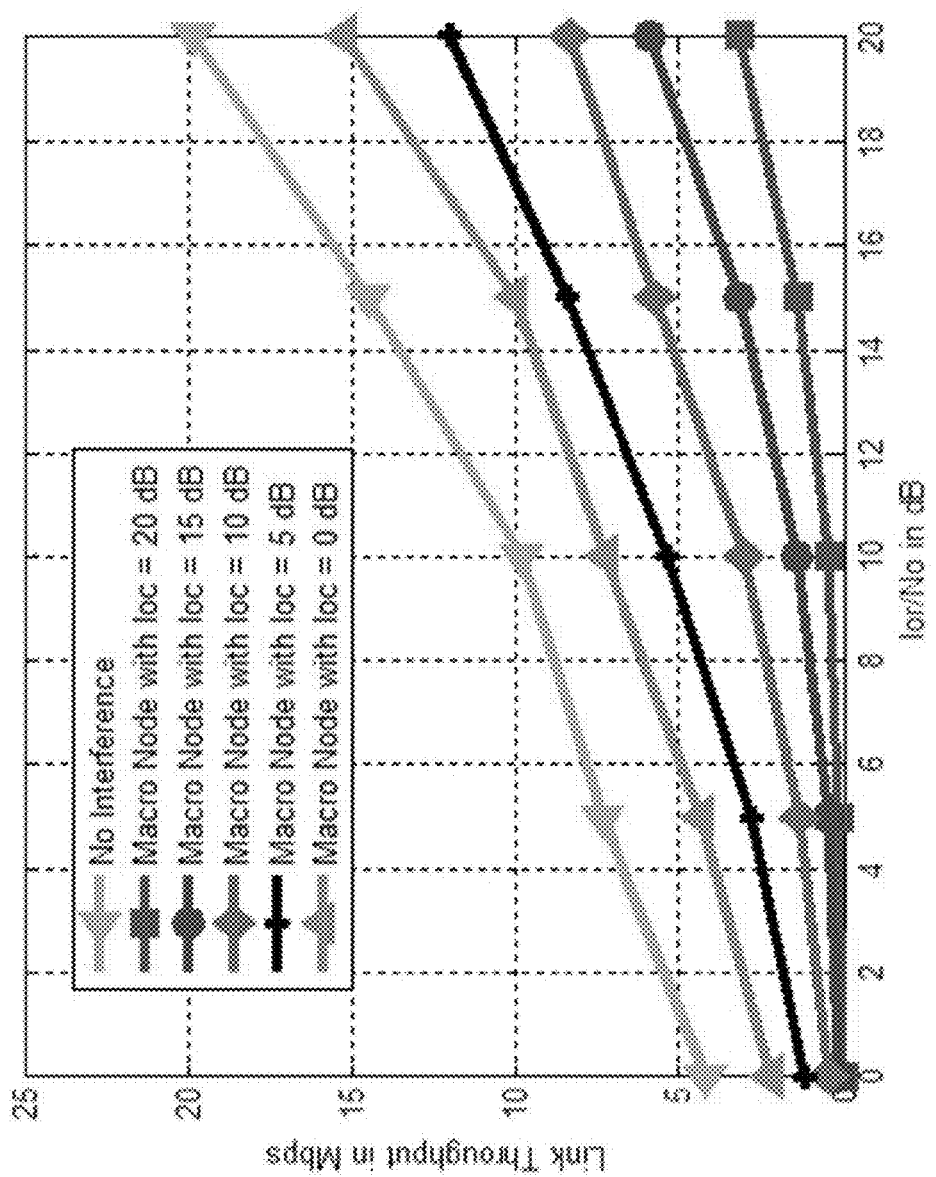
FIG. 7 illustrates link throughput for a UE connected to a LPN in a cell range expansion zone of the LPN with different macro interference values.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following common terminologies are used in the embodiments and are elaborated below:

Radio network node: In some embodiments, the non-limiting term "radio network node" is used. As used herein, a radio network node is any type of network node in the Radio Access Network (RAN) serving User Equipment devices (UEs) and/or connected to other network nodes or network elements, or any network node in the RAN from which a UE receives a signal. Examples of radio network nodes are a base station, a Node B (NB), a Multi-Standard Radio (MSR) radio node such as a MSR base station, an enhanced or evolved NB (eNB), a network controller, a Radio Network Controller (RNC), a base station controller, a relay, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS), etc.

Network node: In some embodiments, a more general term "network node" is used. As used herein, a network node is any node in cellular communications network (e.g., a radio network node or a core network node (i.e., a network node in the core network)). Examples of a network node are any radio network node stated above, any core network node (e.g., a Mobile Switching Centre (MSC), a Mobility Management Entity (MME), etc.), Operations and Maintenance (O&M), Operations Support System (OSS), Self-Optimizing Network (SON), positioning node (e.g., Evolved Serving Mobile Location Centre (E-SMLC)), Minimization of Drive Tests (MDT), etc.

User Equipment or User Equipment device (UE): In some embodiments, the non-limiting term User Equipment or User Equipment device (UE) is used. As used herein, a UE is any type of wireless device communicating with a radio network node in a cellular or mobile communications system. Examples of a UE are a target device, a device to device UE, a machine type UE or a UE capable of machine to machine communication, a Personal Digital Assistant (PDA), an iPad, a tablet, mobile terminals, a smart phone, Laptop Embedded Equipment (LEE), Laptop Mounted Equipment (LME), Universal Serial Bus (USB) dongles, etc.

Systems and methods are disclosed for providing location-based codebook subset restriction. In some embodiments, location-based codebook subset restriction is provided in such a manner as to mitigate co-channel interference from a macro base station to UEs in a cell range expansion zone of a Low Power Node (LPN) within the coverage area of the macro base station. In this manner, performance of the UEs in the cell range expansion zone is improved.

Before proceeding, a discussion of Multiple Input Multiple Output (MIMO) techniques and codebook subset restriction is beneficial. MIMO is an advanced antenna technique utilized in wireless systems (e.g., cellular communications networks) to improve spectral efficiency and thereby boost overall system capacity. For MIMO, a commonly known notation of (M×N) is used to represent the MIMO configuration in terms of the number of transmit antennas (M) and the number of receive antennas (N). Another notation that is sometimes used is $N_T \times N_R$, where $N_T$ is the number of transmit antennas and $N_R$ is the number of receive antennas. The common MIMO configurations used or currently discussed for various technologies are: (2×1), (1×2), (2×2), (4×2), (8×2), (8×4), and (8×8). The MIMO configurations represented by (2×1) and (1×2) are special cases of MIMO, and they correspond to transmit diversity and receive diversity, respectively. Current Long Term Evolution (LTE) and High Speed Packet Access (HSPA) standards (up to Release 12) support the use of a 1-dimensional array of co- or cross-polarized antenna ports. Under development in $3^{rd}$ Generation Partnership Project (3GPP) is standard support for 2-dimensional antenna ports, where antenna ports are located in both vertical and horizontal dimensions.

Using multiple antennas at the transmitter and the receiver can significantly increase system capacity. Specifically, transmission of independent symbol streams in the same frequency bandwidth, which is commonly referred to as Spatial Multiplexing (SM), achieves a linear increase in data rates with the increased number of antennas. On the other hand, by using space-time codes at the transmitter, reliability of the detected symbols can be improved by exploiting the so called transmit diversity. Both the SM scheme and the transmit diversity scheme assume no channel knowledge at the transmitter. However, in practical wireless systems such as the 3GPP LTE, High Speed Downlink Packet Access (HSDPA), and WiMAX wireless systems, channel knowledge can be made available at the transmitter via feedback from the receiver to the transmitter. The transmitter can utilize this channel information to improve the system performance with the aid of precoding. In addition to beamforming gain, the use of precoding avoids the problem of an ill-conditioned channel matrix.

In practice, complete Channel State Information (CSI), or similar known channel properties, may be available for a wireless system using a Time Division Duplexing (TDD) scheme by exploiting channel reciprocity. However, for a wireless system using a Frequency Division Duplexing (FDD) scheme, complete CSI is more difficult to obtain. In a FDD wireless system, some kind of CSI knowledge may be available at the transmitter via feedback from the receiver. These wireless systems are referred to as limited feedback systems. There are many implementations of limited feedback systems such as, e.g., codebook based feedback and quantized channel feedback. 3GPP LTE, HSPA, and WiMax recommend codebook based feedback CSI for precoding. Examples of CSI are Channel Quality Indicator (CQI), Precoding Control Index (PCI) (which is also referred to as a Precoding Matrix Indicator (PMI)), and a Rank Indicator (RI). One type of CSI or a combination of different types of CSI are used by a network node (e.g., a base station such as, for instance, a NB in a Universal Terrestrial Radio Access (UTRA) network or an eNB in LTE) for one or more resource assignment related tasks such as, e.g., scheduling data transmissions to a UE, rank adaptation of MIMO streams, precoder selection for MIMO streams, etc.

In codebook based precoding, a predefined codebook is defined both at the transmitter and at the receiver. The entries of the codebook, which are commonly referred to as precoding matrices, can be constructed using different methods, e.g., Grassmannian, Lloyd's algorithm, Discrete Fourier Transform (DFT) matrix, etc. Each precoder matrix is often chosen to match the characteristics of the N×M MIMO channel matrix H for a particular number of transmit antennas (M) and receive antennas (N), resulting in so-called channel dependent precoding, where $N \geq 1$ and $M \geq 1$. This channel dependent precoding is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced. At the receiver, it is common to find the Signal to Interference plus Noise Ratio (SINR) with different codebook entries and choose the rank/precoding index that gives highest spectral efficiency (capacity).

Codebook subset restriction, which is also referred to as precoding weight restriction, is a mechanism by which the network can choose only a small number of precoding elements and indicate to the UE that the UE is to only evaluate this small number of precoding elements, rather than the full codebook, when providing feedback to the network.

According to LTE 3GPP Technical Specification (TS) 36.213 Release 8, a UE is restricted to report a PMI and RI within a precoder codebook subset specified by a bitmap parameter codebookSubsetRestriction configured by higher layer signaling. For a specific precoder codebook and associated transmission mode, the bitmap can specify all possible precoder codebook subsets from which the UE can assume the eNB may be using when the UE is configured in the relevant transmission mode. Codebook subset restriction is supported for open-loop spatial multiplexing, closed-loop spatial multiplexing, multi-user MIMO, and closed-loop Rank=1 precoding. The resulting number of bits for each transmission mode is given in Table 1 below. The bitmap forms the bit sequence $a_{A_c-1}, \ldots, a_3, a_2, a_1, a_0$ where $a_0$ is the Least Significant Bit (LSB), $a_{A_c-1}$ is the Most Significant Bit (MSB), and where a bit value of zero indicates that the PMI and RI reporting is not allowed to correspond to precoder(s) associated with the bit. The associations of bits to precoders for the relevant transmission modes are given as follows:

TABLE 1

Number of bits in codebook subset restriction bitmap for applicable transmission modes.

| | | Number of bits $A_c$ | |
|---|---|---|---|
| | | 2 antenna ports | 4 antenna ports |
| Transmission mode | Open-loop spatial multiplexing | 2 | 4 |
| | Closed-loop spatial multiplexing | 6 | 64 |
| | Multi-user MIMO | 4 | 16 |
| | Closed-loop rank = 1 precoding | 4 | 16 |

In HSPA, according to 3GPP TS 25.214 Release 10, a UE is restricted to report Precoding Control Index (PCI), and Number of Transport Blocks Preferred (NTBP) within a precoder codebook subset specified by a bitmap parameter PrecodingWeightRestriction configured by higher layer signaling. The bitmap can specify all possible precoder codebook subsets from which the UE can assume the NB may be using when the UE is configured in MIMO mode. The bitmap forms the bit sequence $a_{63}, \ldots, a_3, a_2, a_1, a_0$ where $a_0$ is the LSB and $a_{63}$ is the MSB for four transmit antennas and $a_8, \ldots, a_3, a_2, a_1, a_0$ for two transmit antennas. In codebook weight restriction, a bit value of zero indicates that the precoding indices reporting is not allowed in the NTBP/PCI/CQI report.

Systems and methods are disclosed for providing location-based codebook subset restriction. In some embodiments, location-based codebook subset restriction is provided in such a manner as to decrease co-channel interference to UEs located in a cell range expansion zone of a LPN, thereby improving the performance of those UEs in the cell range expansion zone of the LPN. In some embodiments, a network node determines a codebook subset restriction for a UE based on the location of the UE within a serving macro cell of the UE and sends an indication of the codebook subset restriction to the UE. If the location of the UE is such that downlink transmissions to the UE may result in significant interference to UEs in the cell range expansion zone of the LPN (e.g., if the UE is located near the cell edge), then the codebook subset restriction limits feedback to only those ranks/precoding matrices that would mitigate interference to UEs in the cell range expansion area of the LPN (e.g., limit feedback to only those ranks/precoding matrices having antenna patterns with high directivity or small side lobes). The codebook subset restriction informs the UE to limit its feedback to non-restricted ranks/precoding matrices. Once the UE receives the codebook subset restriction, the UE will not report/recommend ranks/precoding matrices forbidden by the codebook subset restriction. Hence, when transmitting data to this particular UE, the network can limit precoding in such a manner that interference to the UEs in the cell range expansion zone of the LPN is mitigated and thereby improve the performance of UEs in the cell range expansion zone of the LPN. Using this technique, aggressive cell range expansion can be used without performance loss on the individual UE throughputs in the cell range expansion zone. This in turn improves the UE throughput as well as the average sector capacity.

Notably, while much of the description herein focuses on an example in which there is one macro base station and one LPN, the concepts disclosed herein are equally applicable to deployments with many LPNs within the macro base station coverage area. Also, while described with respect to a heterogeneous network, the concepts disclosed herein are also applicable to homogeneous networks. Further, while some specific examples are given below using a four transmit antenna codebook, the concepts disclosed herein are applicable to codebooks for any number of transmit antennas (e.g., 8, 16, 64, etc.).

Figure 8:
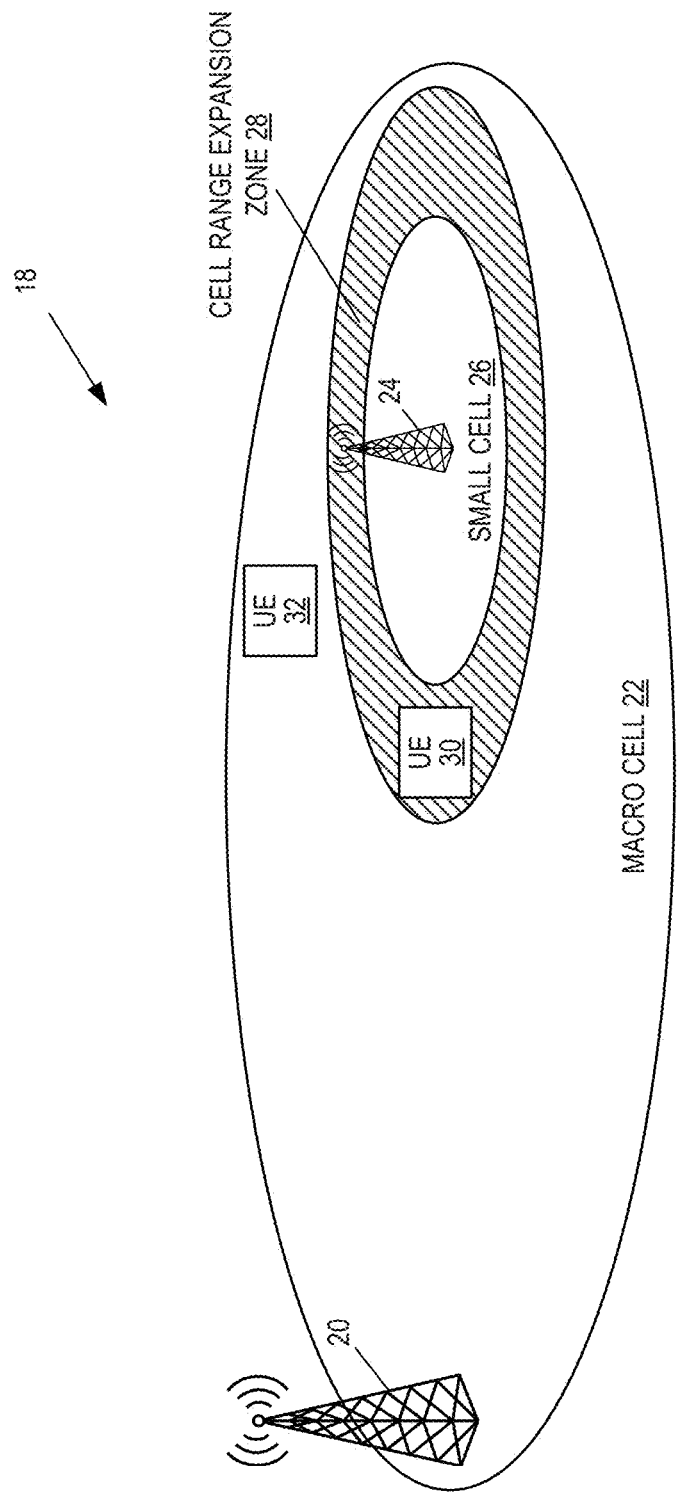
FIG. 8 illustrates a heterogeneous network in which location-based codebook subset restriction is provided according to some embodiments of the present disclosure.

FIG. 8 illustrates a heterogeneous network 18 in which location-based codebook subset restriction is provided according to some embodiments of the present disclosure. As illustrated, the heterogeneous network 18 includes a macro base station 20 providing a macro cell 22, a LPN 24 providing a small cell 26, and a cell range expansion zone 28 in which UEs, such as UE 30, are served by the LPN 24. The cell range expansion zone 28 is a zone in which at least some UEs 30 located within that zone are offloaded to the LPN 24 even though, in the cell range expansion zone 28, the macro cell 22 is the strongest cell. As discussed below, a network node (e.g., the macro base station 20) operates to provide location-based codebook subset restriction for UEs, such as UE 32, located in the macro cell 22 in such a manner that co-channel interference to UEs, such as the UE 30, located in the cell range expansion zone 28 of the LPN 24 is mitigated.

Figure 9:
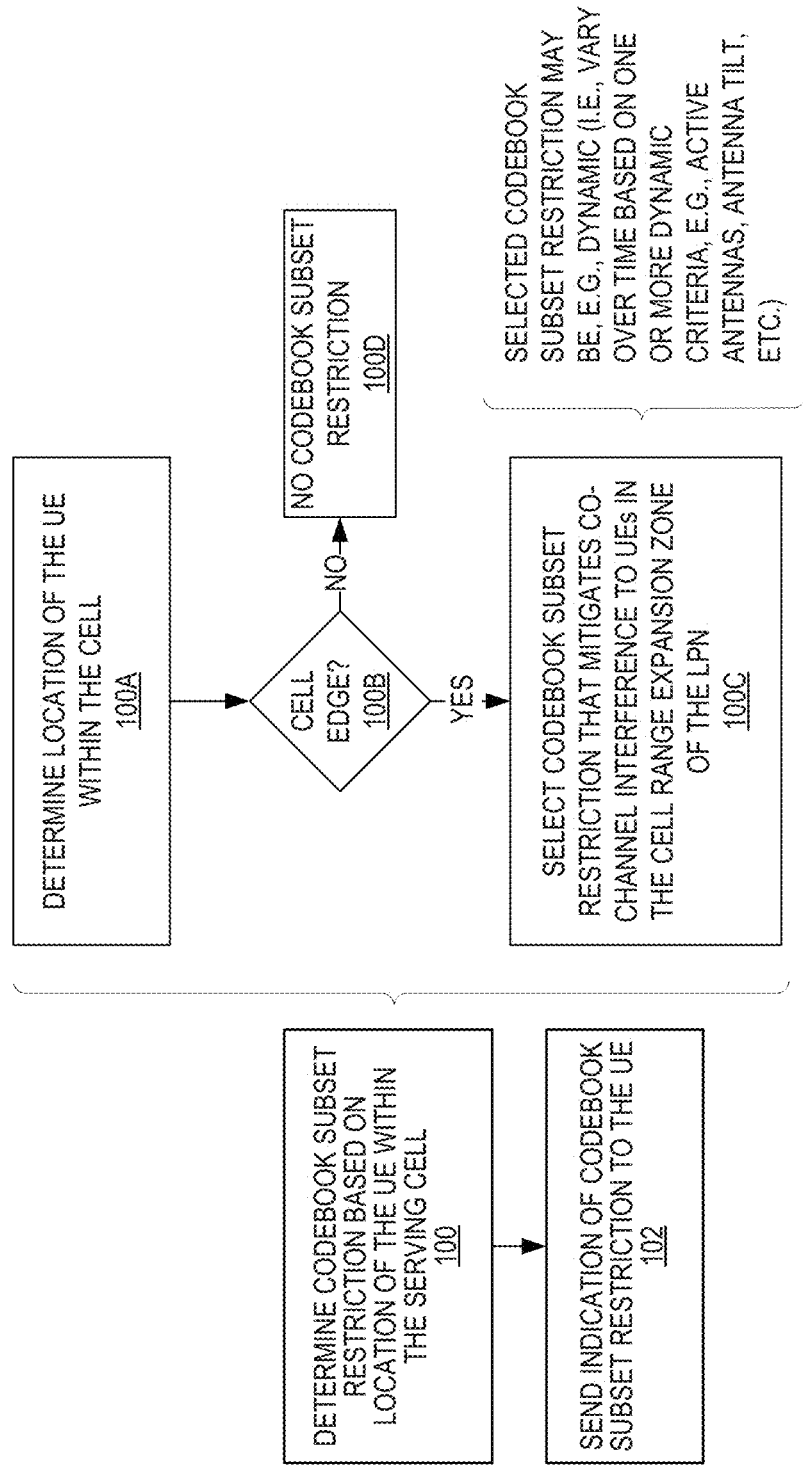
FIG. 9 is a flow chart that illustrates the operation of a network node (e.g., a macro base station) to provide location-based codebook subset restriction according to some embodiments of the present disclosure.

In this regard, FIG. 9 is a flow chart that illustrates the operation of a network node (e.g., the macro base station 20) to provide location-based codebook subset restriction according to some embodiments of the present disclosure. Notably, while figures such as FIG. 9 illustrate "steps," these "steps" may be performed in any desired order unless explicitly stated or otherwise required. As illustrated, the network node first determines a codebook subset restriction for the UE 32 based on the location of the UE 32 within the serving cell of the UE 32, which in this example is the macro cell 22 (step 100). The codebook subset restriction limits which precoding elements (i.e., precoding matrices) in the full codebook for the appropriate number of transmit antennas and transmission mode can be used for downlink transmission to the UE 32.

As illustrated, in some embodiments, the codebook subset restriction is determined based on whether the UE 32 is near the edge of the macro cell 22. If the UE 32 is near the cell edge, then downlink transmissions to the UE 32 will be transmitted at high power and, therefore, are more likely to cause interference to the UE 30 in the cell range expansion zone 28 of the LPN 24. As such, in order to determine the codebook subset restriction for the UE 32, the network node determines the location of the UE 32 within the serving cell, which again in this example is the macro cell 22 (step 100A). The location of the UE 32 within the macro cell 22 may be determined using any suitable technique such as, for example, a position estimate or measurement from a positioning system (e.g., Global Positioning System (GPS) or other satellite based positioning system), using reported CQIs from the UE 32, using mobility measurement reports from the UE 32, or the like. For mobility reasons, the UE 32 measures and reports received power (e.g., Reference Signal Received Power (RSRP)) from several neighboring cells. The relationship between the RSRP values is an indication of where the UE 32 is located in the known cell layout of the cellular communications network. Similarly, the size of a Neighbor Cell List (NCL) for the UE 32 is an indication of whether the UE 32 is located at the cell edge or not. If the UE 32 is located near the cell edge (step 100B; YES), the network node selects a codebook subset restriction for the UE 32 that mitigates co-channel interference to UEs, such as the UE 32, in the cell range expansion zone 28 of the LPN 24 (step 100C).

As discussed below, the codebook subset restriction restricts the use of precoding elements to only those precoding elements having antenna patterns that mitigate co-channel interference to UEs in the cell range expansion zone 28 of the LPN 24. Notably, since the configuration of the macro base station 20 may vary over time, the codebook subset restriction is, at least in some embodiments, dynamic (i.e., a function of one or more dynamic criteria). For example, the number of active transmit antennas and/or which transmit antennas are active for downlink transmissions from the macro base station 20 may vary over time. Other parameters such as, for example, antenna tilt may also vary over time. These variations result in variations in the antenna patterns for the different precoding elements in the precoding codebook. As a result, the precoding elements having antenna patterns that mitigate co-channel interference to the UEs in the cell range expansion zone 28 of the LPN 24 (e.g., the precoding elements having antenna patterns with high directivity and/or low side lobes), and thus the codebook subset restriction, may vary over time. For example, different codebook subset restrictions may be predefined (e.g., by the operator of the network or by a standard) for, e.g., different antenna configurations (e.g., for different sets or numbers of active transmit antennas). The network node may then select the appropriate codebook subset restriction for the UE 32 in step 100C.

Returning to step 100B, if the UE 32 is not at the cell edge (step 100B; NO), then, in this example, there is no codebook subset restriction for the UE 32 (step 100D). Once the codebook subset restriction is determined, the network node sends an indication of the codebook subset restriction to the UE 32 (step 102). For LTE, the codebook subset restriction can be indicated via, e.g., the parameter codebookSubsetRestriction. For HSPA, the codebook subset restriction can be indicated via, e.g., the parameter PrecodingWeightRestriction.

Figure 10:
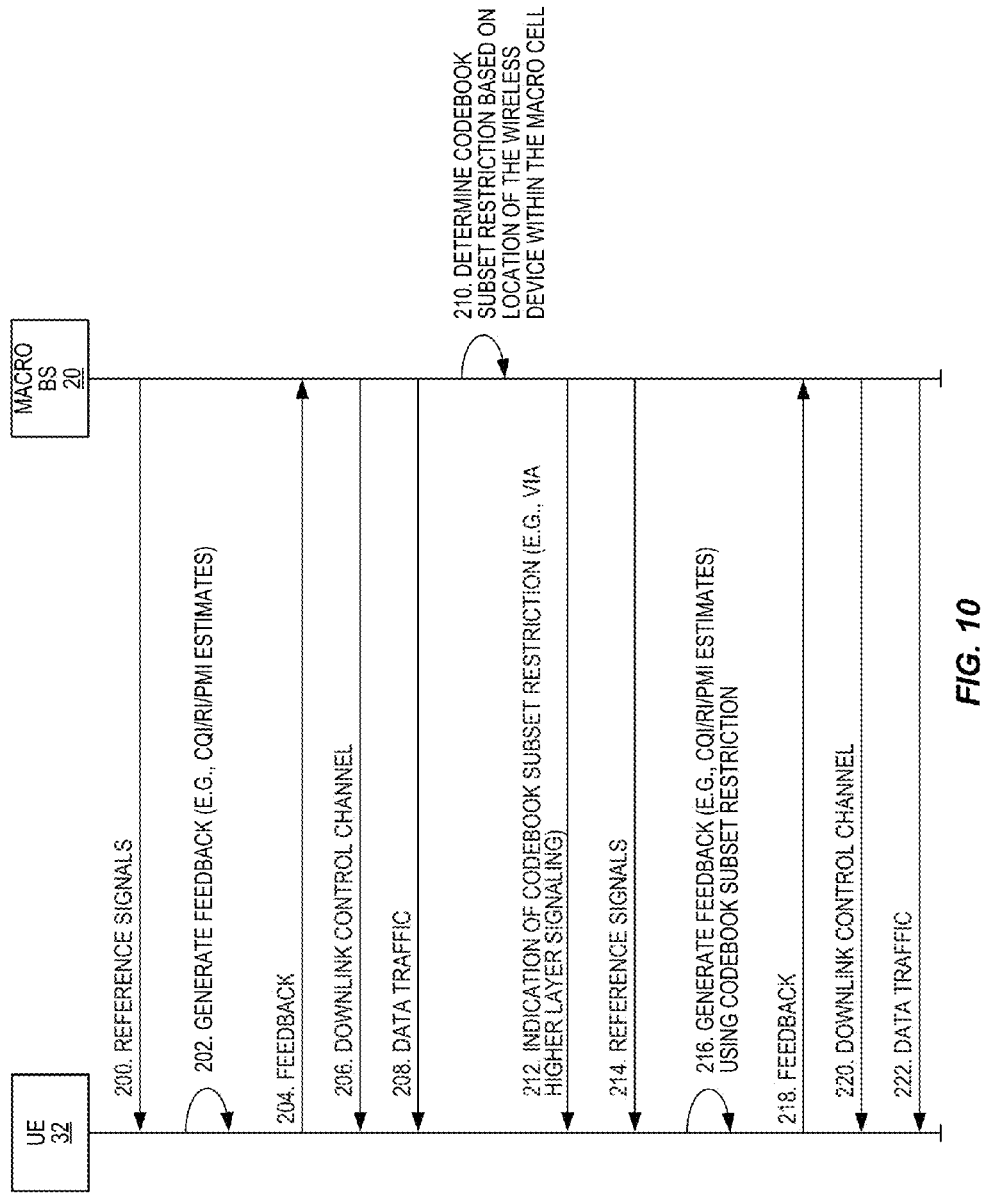
FIG. 10 illustrates the operation of the macro base station and the UE of FIG. 8 according to some embodiments of the present disclosure.

FIG. 10 illustrates the operation of the macro base station 20 and the UE 32 according to some embodiments of the present disclosure. In this process, the macro base station 20 performs the process of FIG. 9. As illustrated, the macro base station 20 transmits reference signals in the conventional manner (step 200). The UE 32 uses the reference signals to generate feedback (e.g., a CSI report containing CQI, RI, and PMI estimates) and provide corresponding feedback to the macro base station 20 in the conventional manner (steps 202 and 204). Once the macro base station 20 receives this feedback, the macro base station 20 schedules the UE 32 by providing scheduling information to the UE 32 in a downlink control channel (step 206). The scheduling information may contain parameters such as modulation, transport block size, number of transmission layers, and precoding matrix index (only for certain transmission modes in LTE/LTE Advanced (LTE-A)). The macro base station 20 transmits data to the UE 32 in the downlink (step 208). Until this point, the process is the conventional one. Notably, in some implementations, steps 200-208 may not be performed (i.e., steps 200-208 are optional).

In this example, the macro base station 20 determines a codebook subset restriction for the UE 32 based on the location of the UE 32 within the macro cell 22 and provides an indication of the codebook subset restriction to the UE 32, as described above (steps 210 and 212). The process then continues in the conventional manner, but using the codebook subset restriction. In particular, the macro base station 20 transmits reference signals to the UE 32 (step 214). Using the reference signals, the UE 32 generates feedback using the codebook subset restriction (step 216). For example, rather than evaluating the full codebook when generating the feedback (e.g., recommended/preferred RI/PMI), the UE 32 may only evaluate the non-restricted precoding elements from the codebook. In particular, the UE 32 will not report PMI corresponding to any of the restricted precoding elements and, in addition, will not consider these PMI metrics (in capacity, mutual information, SINR) when finding the RI and the CQI. The UE 32 provides the generated feedback to the macro base station 20 (step 218).

Once the macro base station 20 receives this feedback, the macro base station 20 schedules the UE 32 by providing scheduling information to the UE 32 in a downlink control channel (step 220). Importantly, as a result of the location-based codebook subset restriction, the UE 32 does not report/recommend, and the macro base station 20 does not select, a precoding element restricted by the codebook subset restriction (i.e., a precoding element that would result in co-channel interference to UEs in the cell range expansion zone 28 of the LPN 24). The macro base station 20 transmits data to the UE 32 in the downlink according to the scheduling information in step 220 (step 222). Notably, steps 210 and 212 may be repeated as desired in order to, e.g., update the codebook subset restriction or remove the codebook subset restriction as the UE 32 moves within the macro cell 22 (e.g., no codebook subset restriction once the UE 32 moves near the cell center).

As discussed above, the precoding elements restricted by the codebook subset restriction are selected, at least in some embodiments, to mitigate co-channel interference to UEs in the cell range expansion zone 28 of the LPN 24. The following discussion provides one example of how this codebook subset restriction is selected.

In the 3GPP LTE standard, separate codebooks are defined for various combinations of the number of transmit antennas and the number of transmission layers. The latter is also called RI. For example, a total of 64 precoding vectors and matrices are defined as shown in Table 2 below for four transmit antennas. Table 3 below shows the PMI codebook for two transmit antennas. Also for each rank in the codebook for the scenarios of RI=1, 2, 3, and 4, 16 elements per rank are defined.

Table 2 below is a PMI codebook for four transmit antennas as defined in 3GPP TS 36.211 (version 8.0). In Table 2, the number of layers is the rank, which is also the number of independent streams. Also, $u_n$ is the basis vector where n goes from 0 to 15.

Figure 11A:
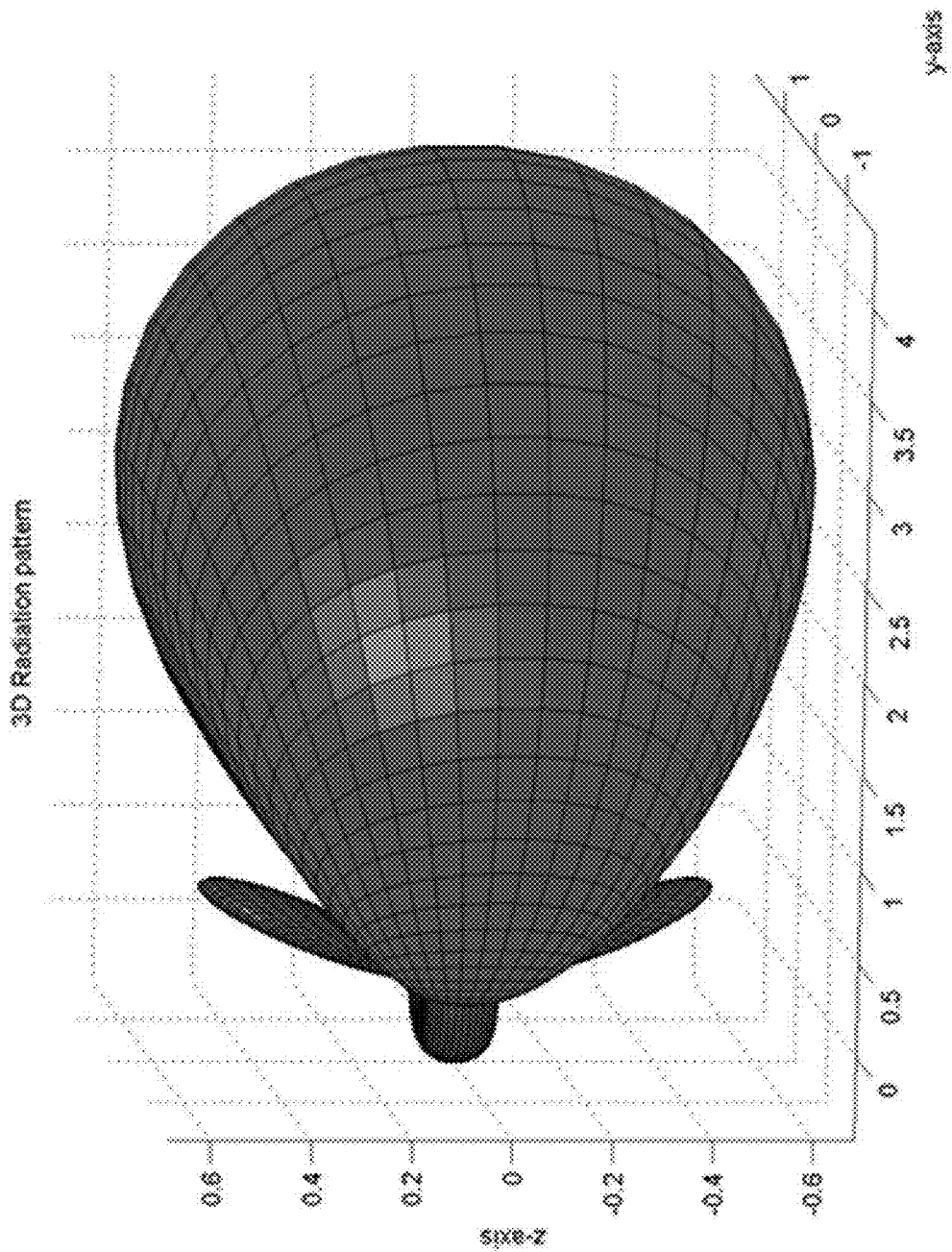
FIGS. 11A through 11P illustrate example radiation, or antenna, patterns for four equally spaced (A/2 separation) transmit antennas with the same polarization in three dimensions for a rank of one.
Figure 11B:
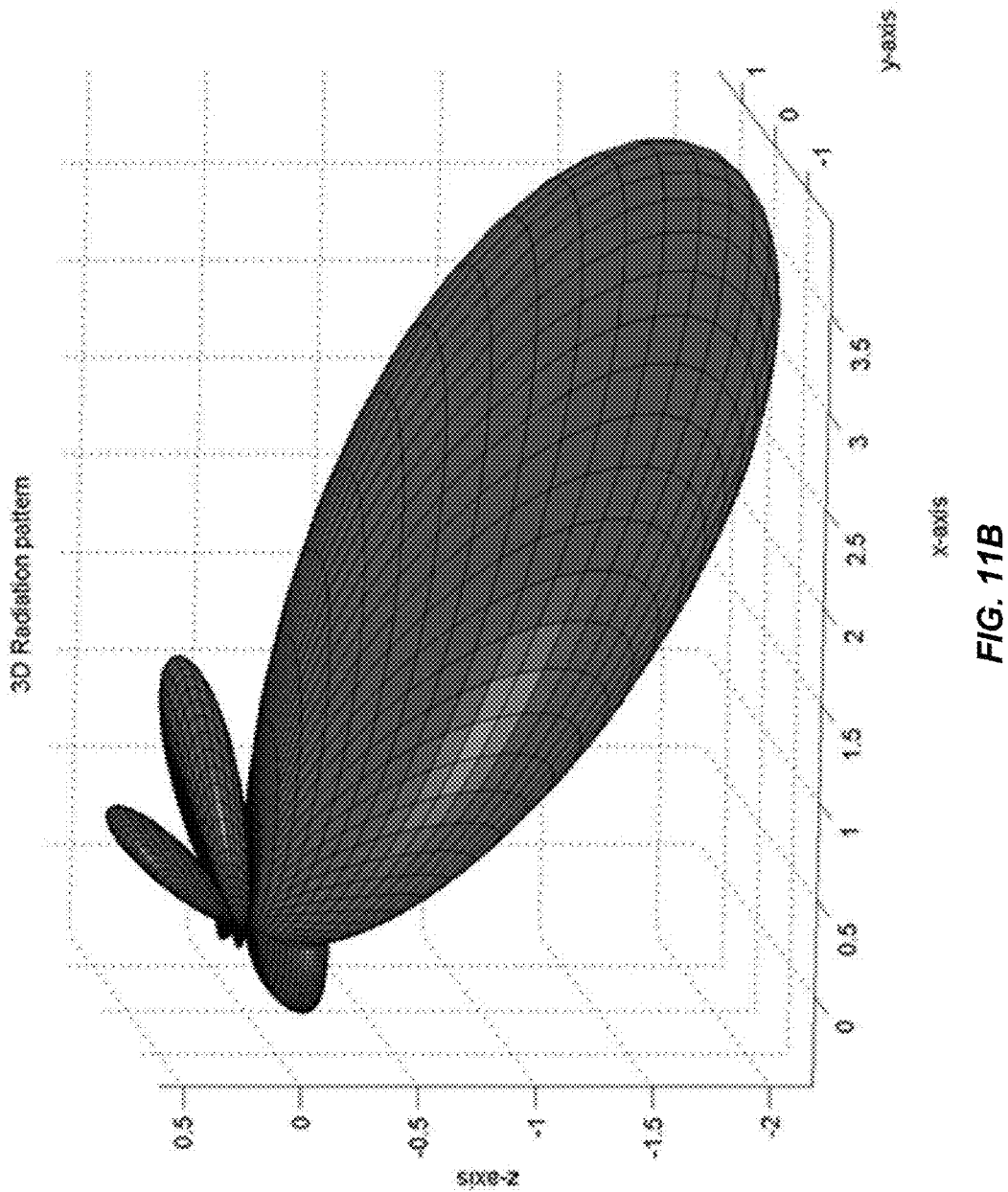
Figure 11C:
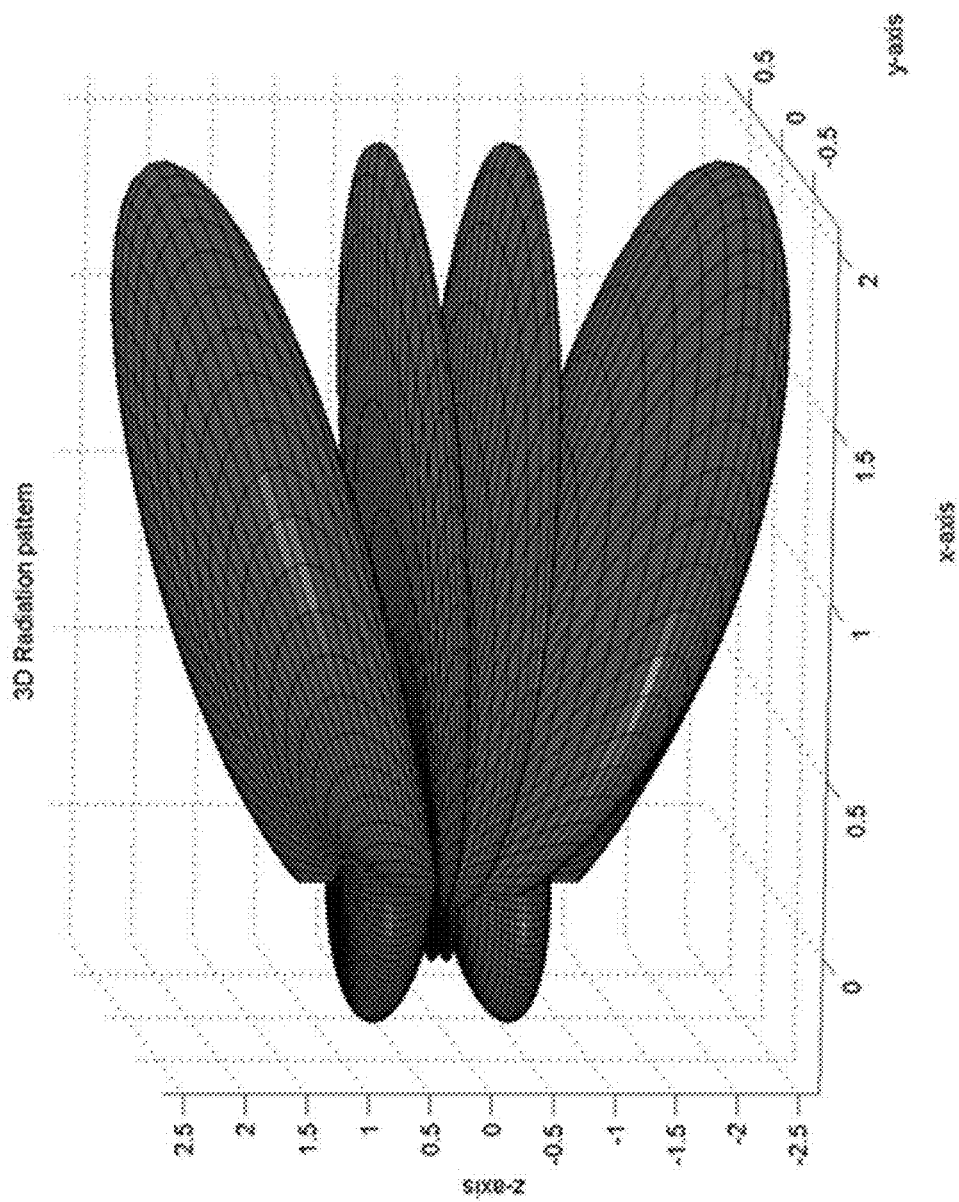
Figure 11D:
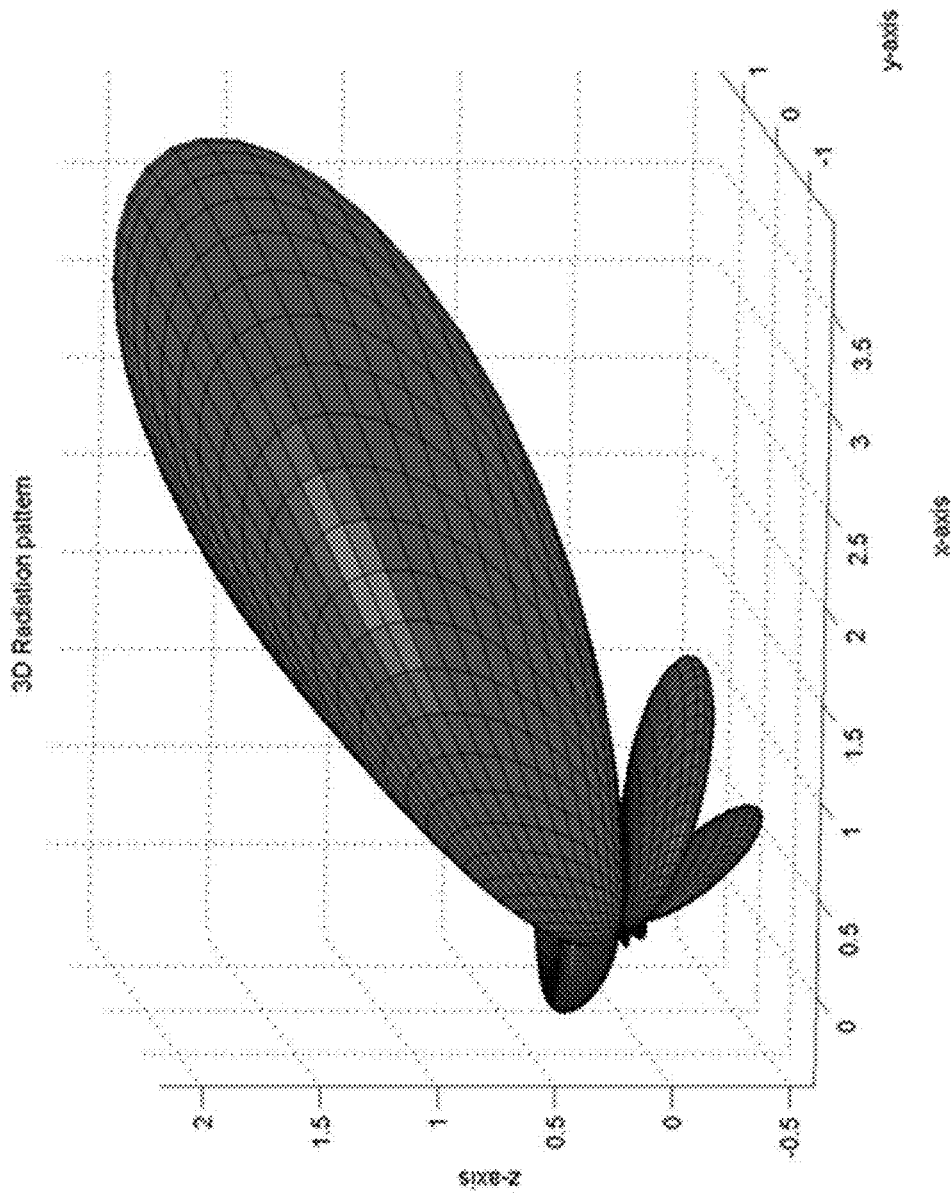
Figure 11E:
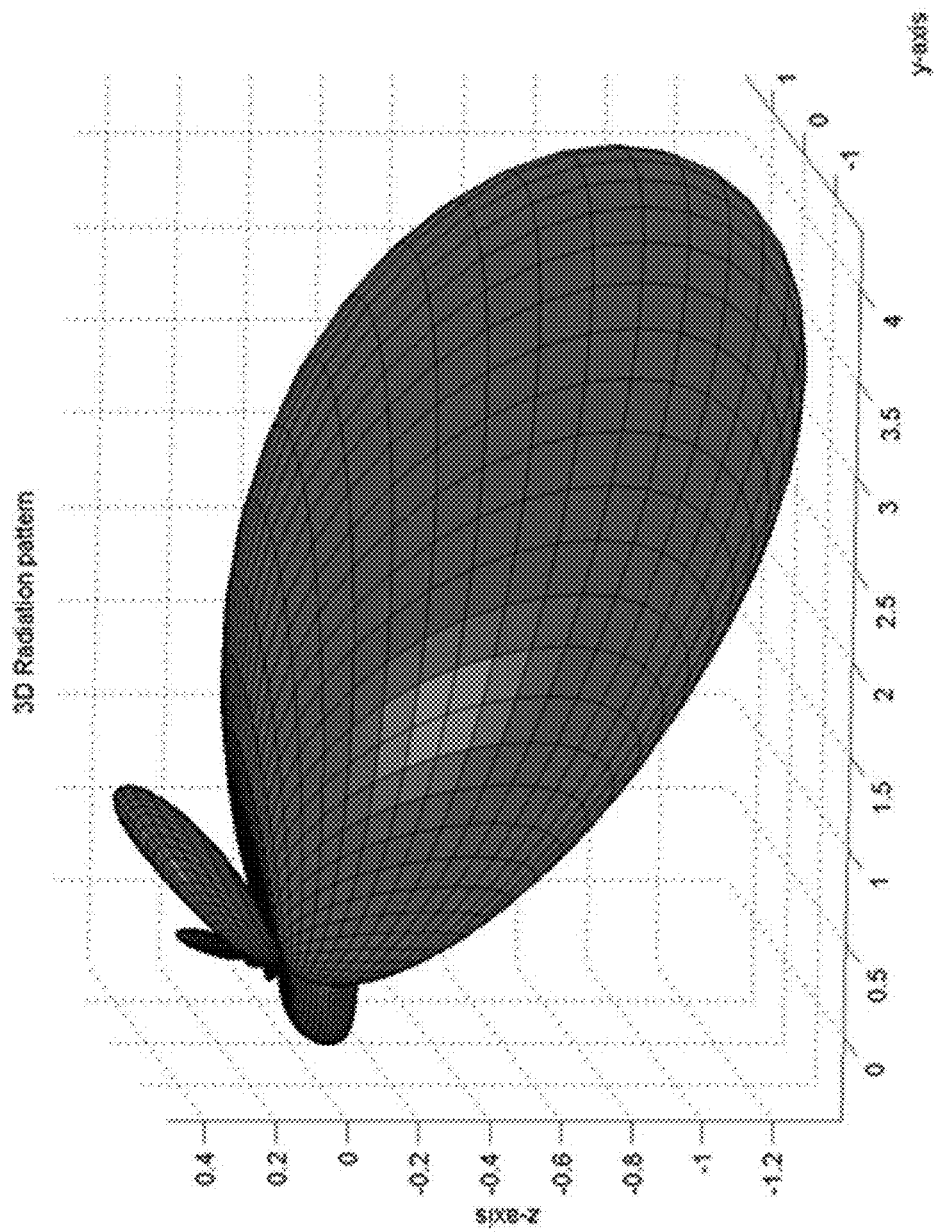
Figure 11F:
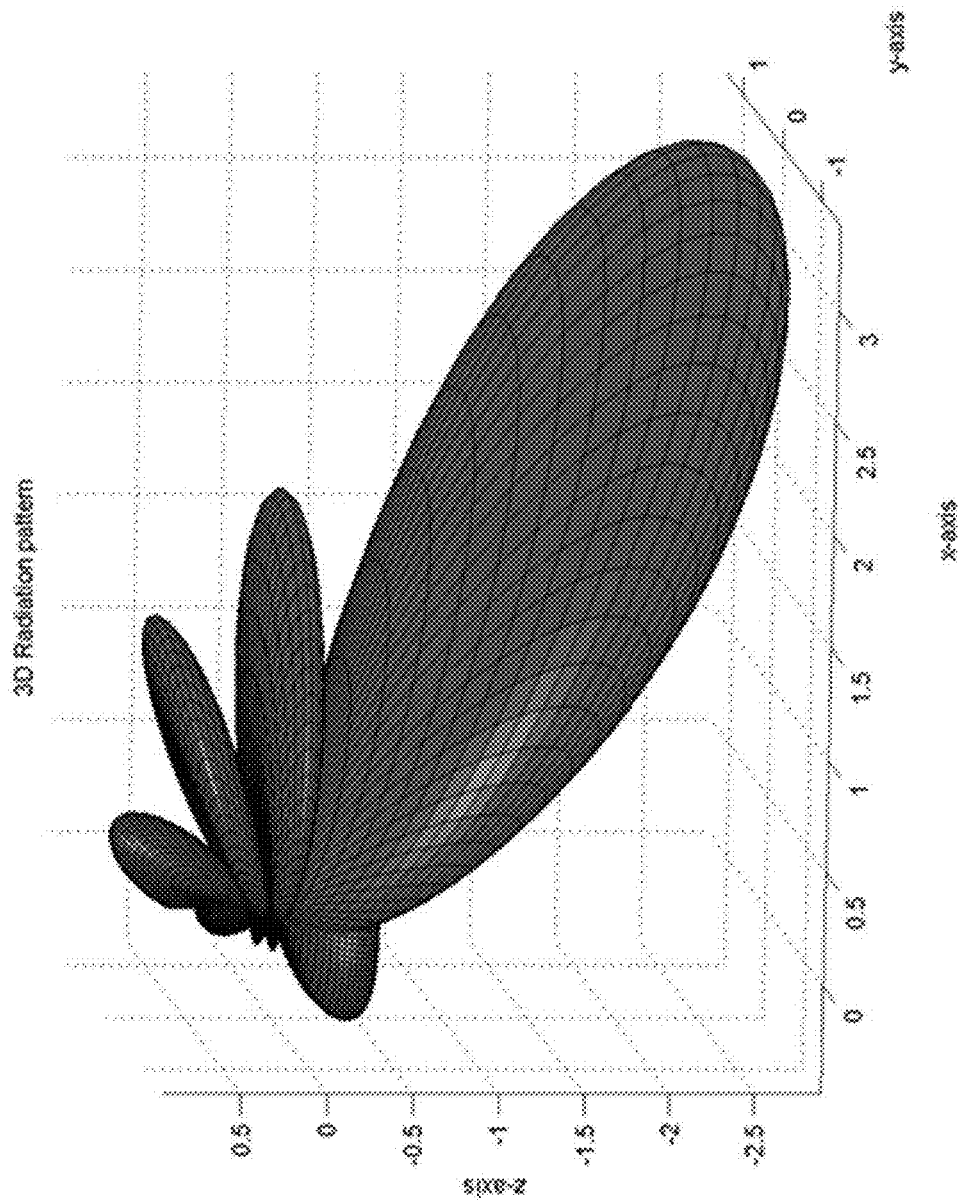
Figure 11G:
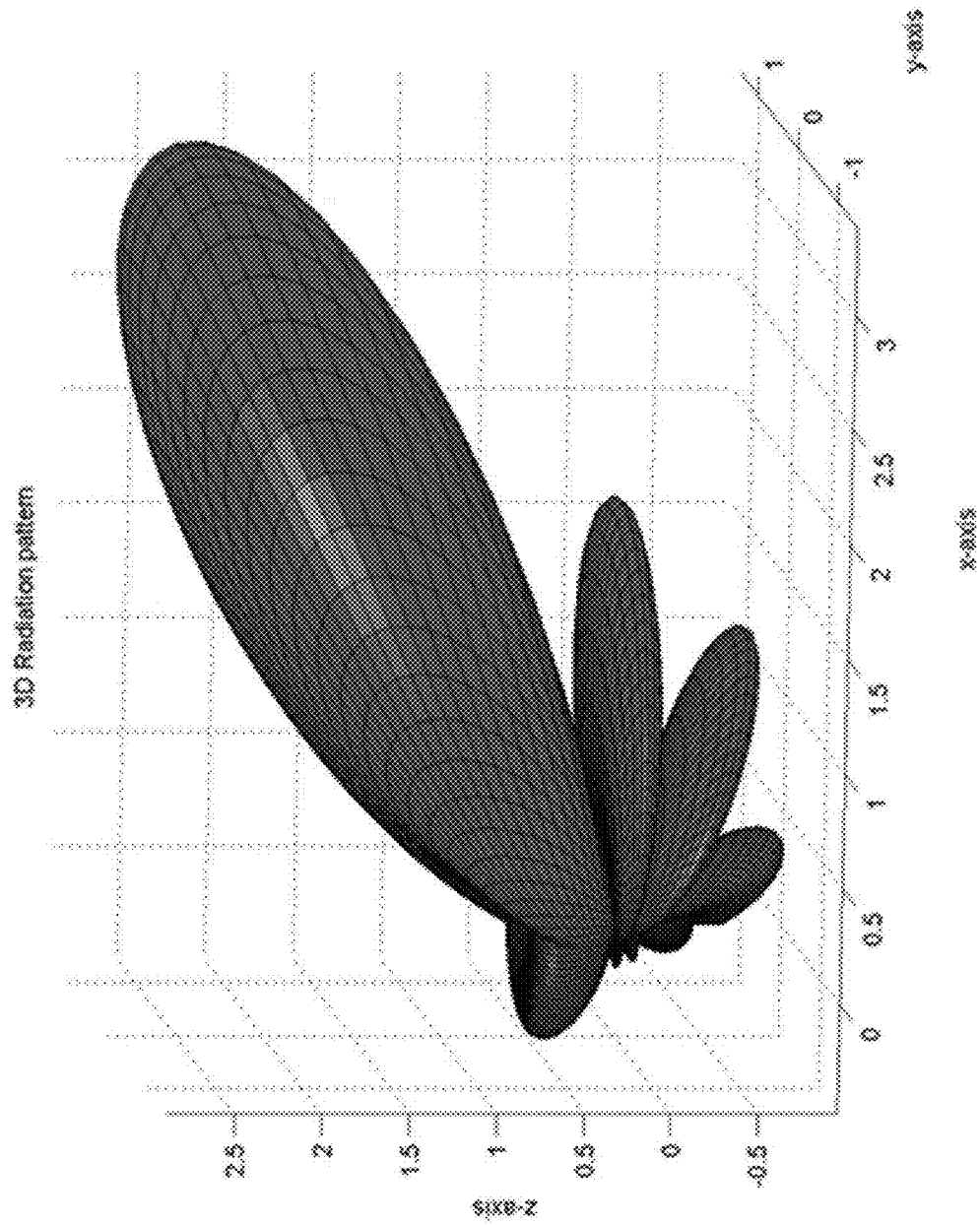
Figure 11H:
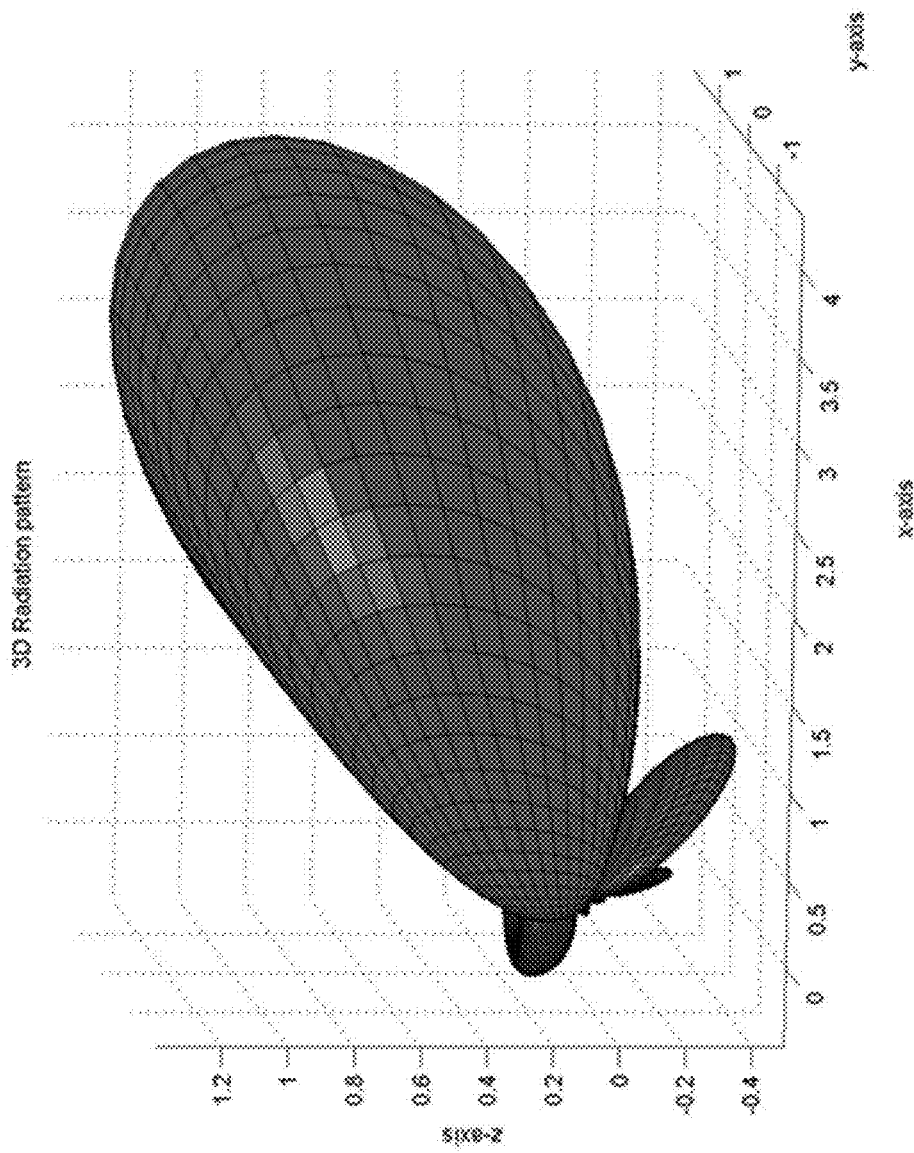
Figure 11I:
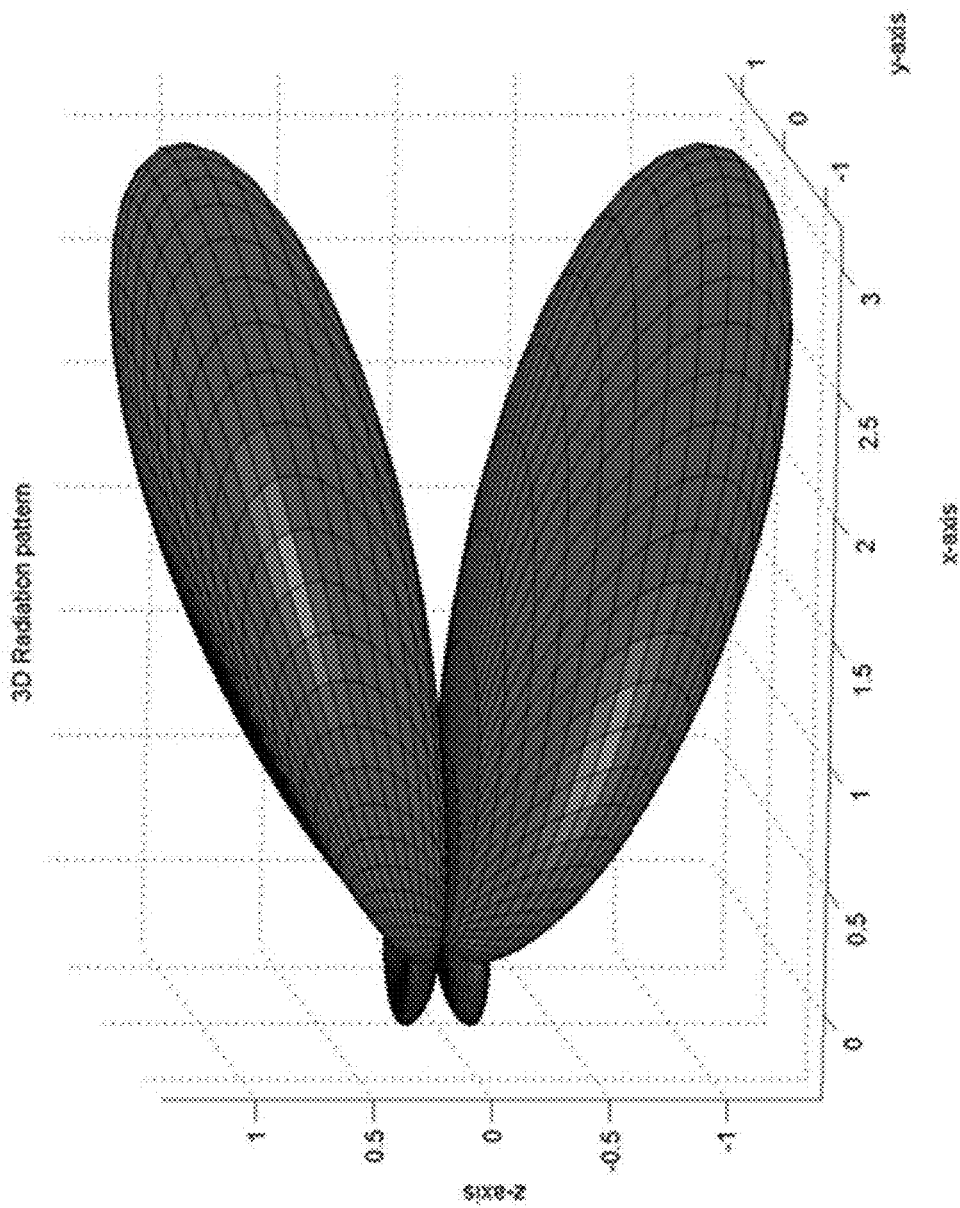
Figure 11J:
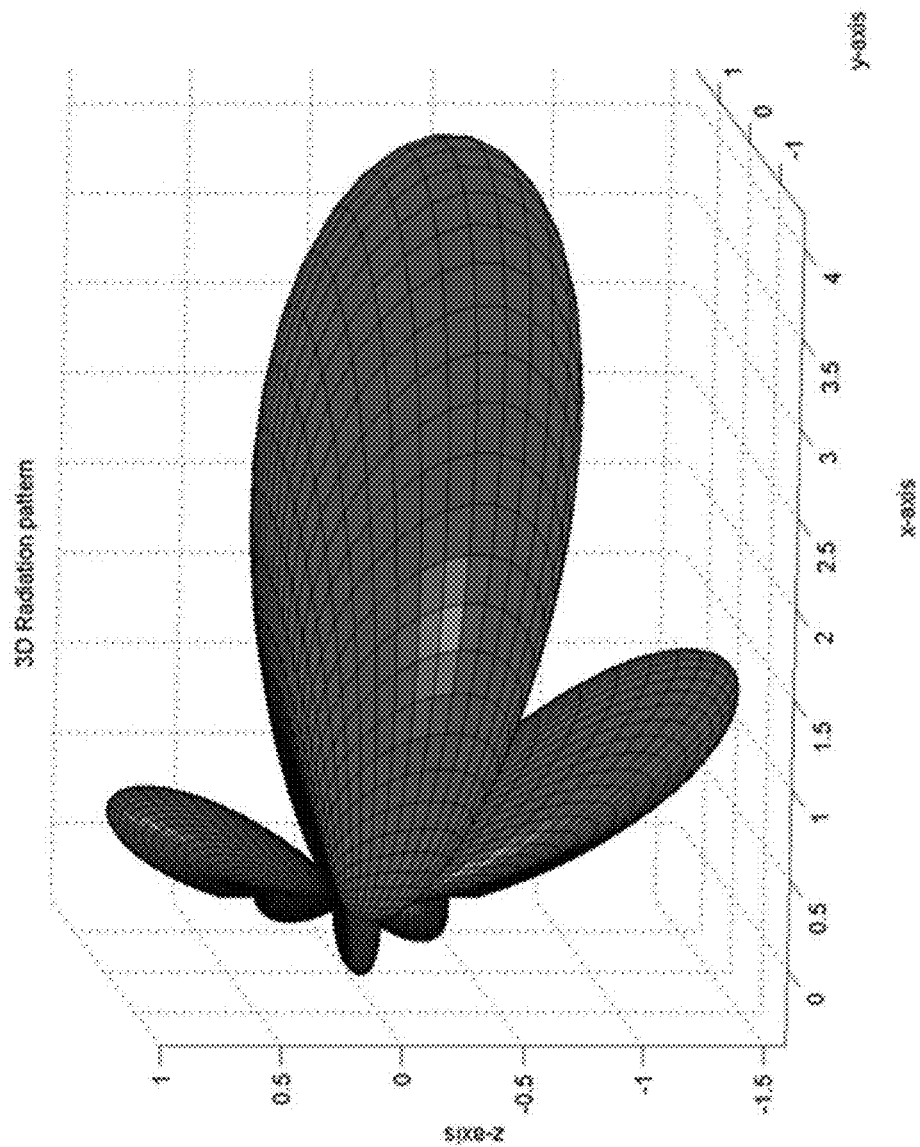
Figure 11K:
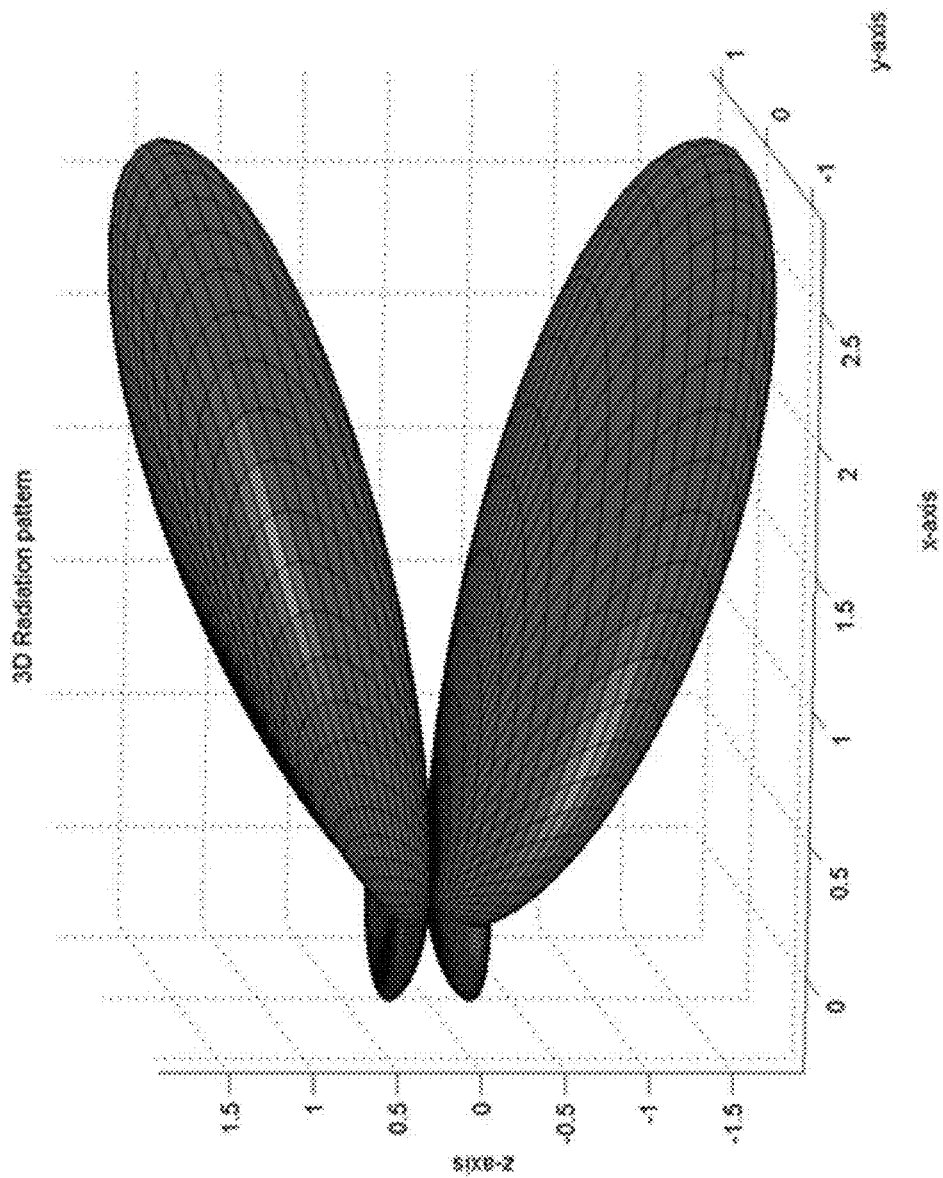
Figure 11L:
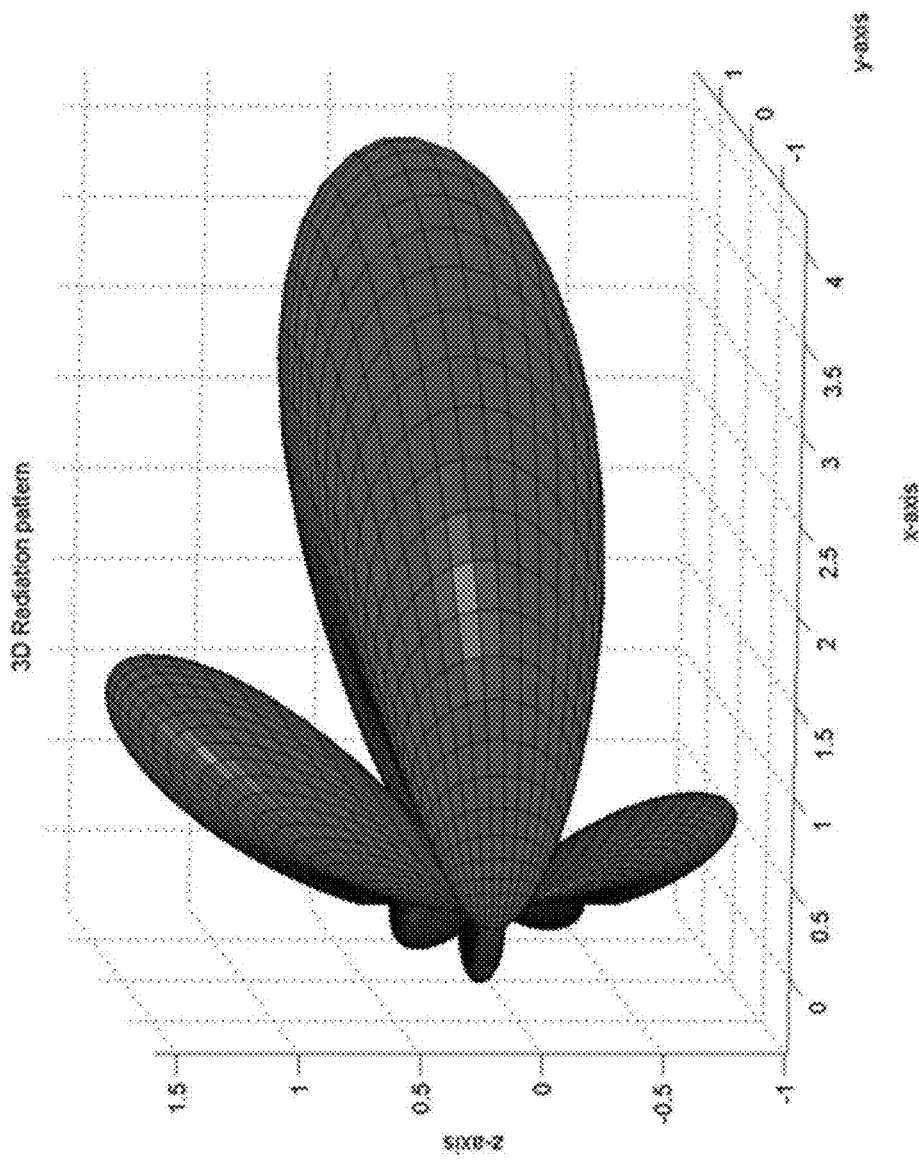
Figure 11M:
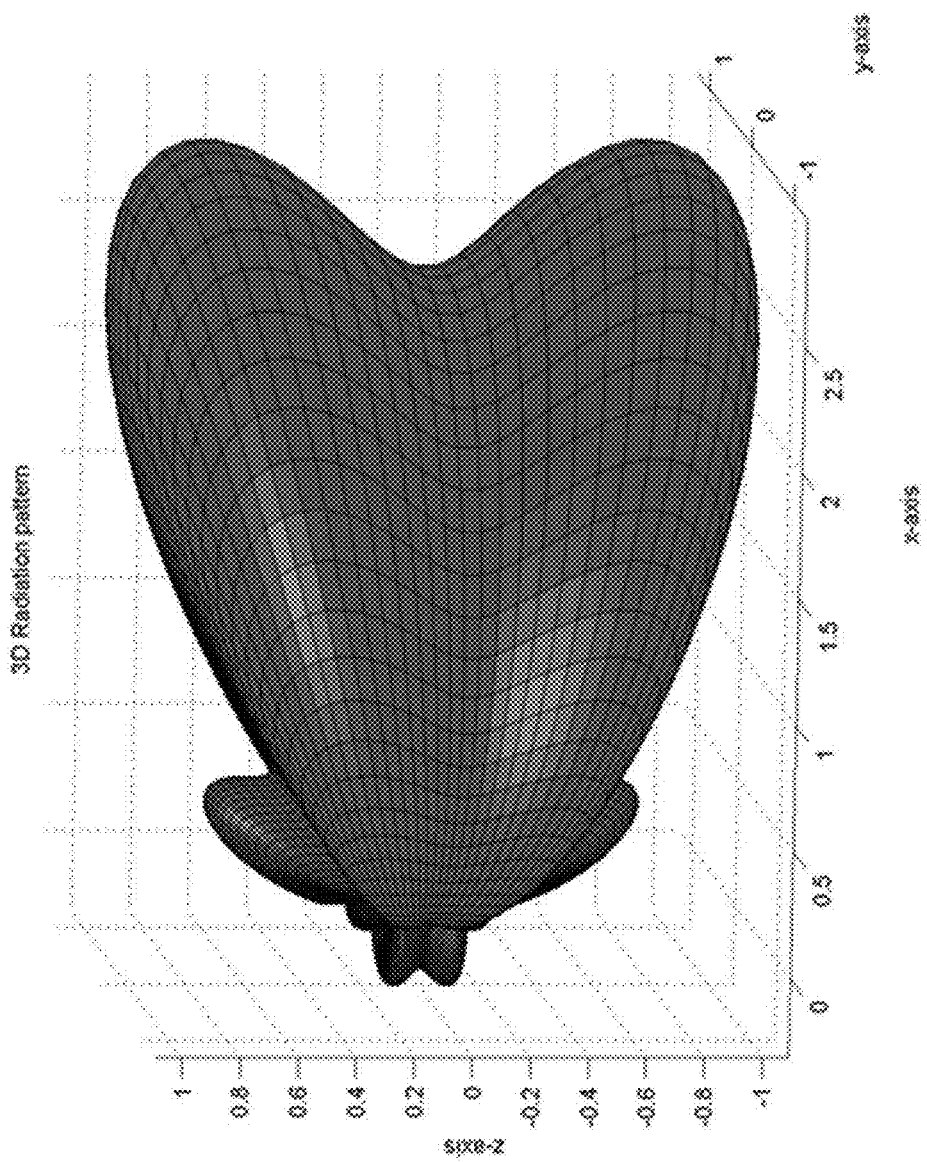
Figure 11N:
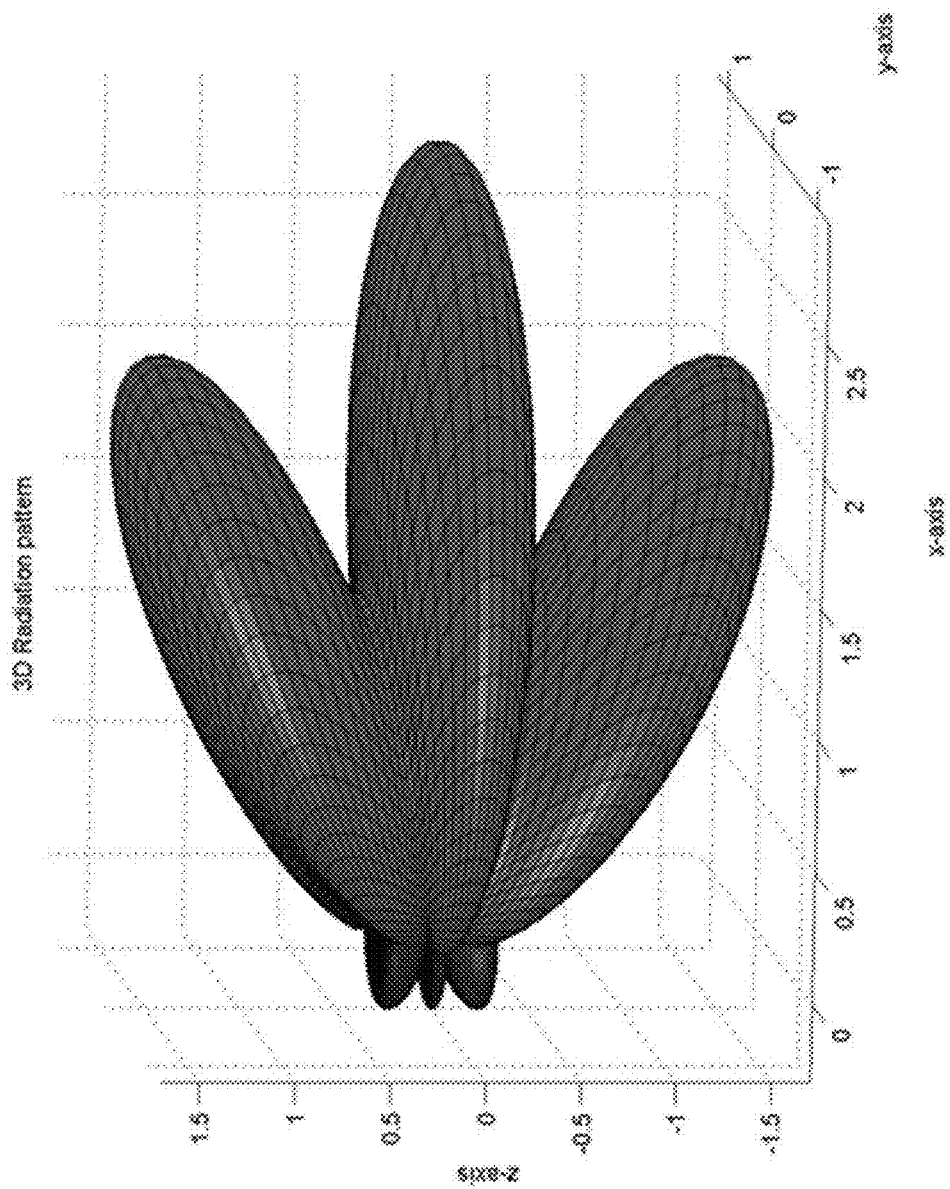
Figure 11O:
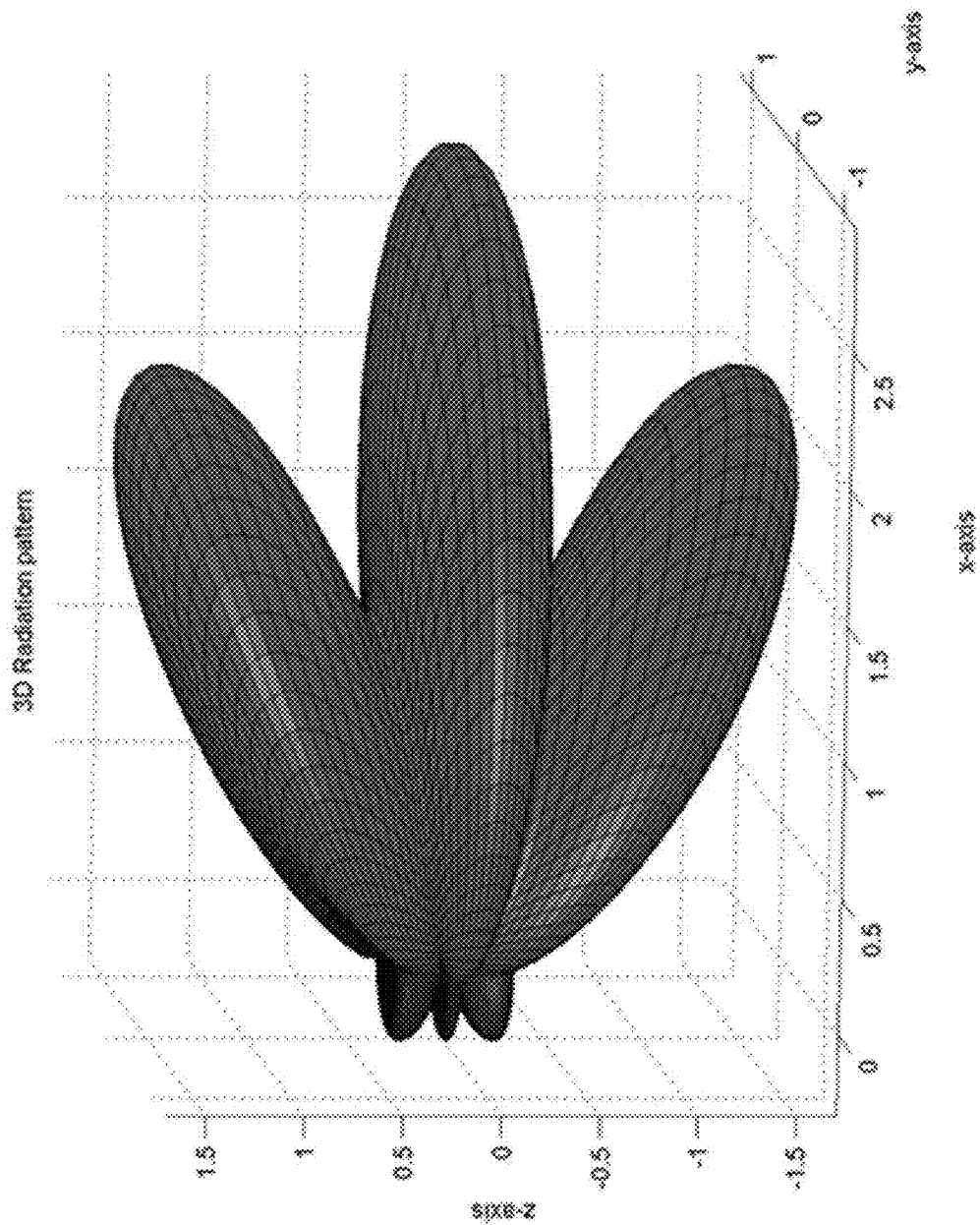
Figure 11P:
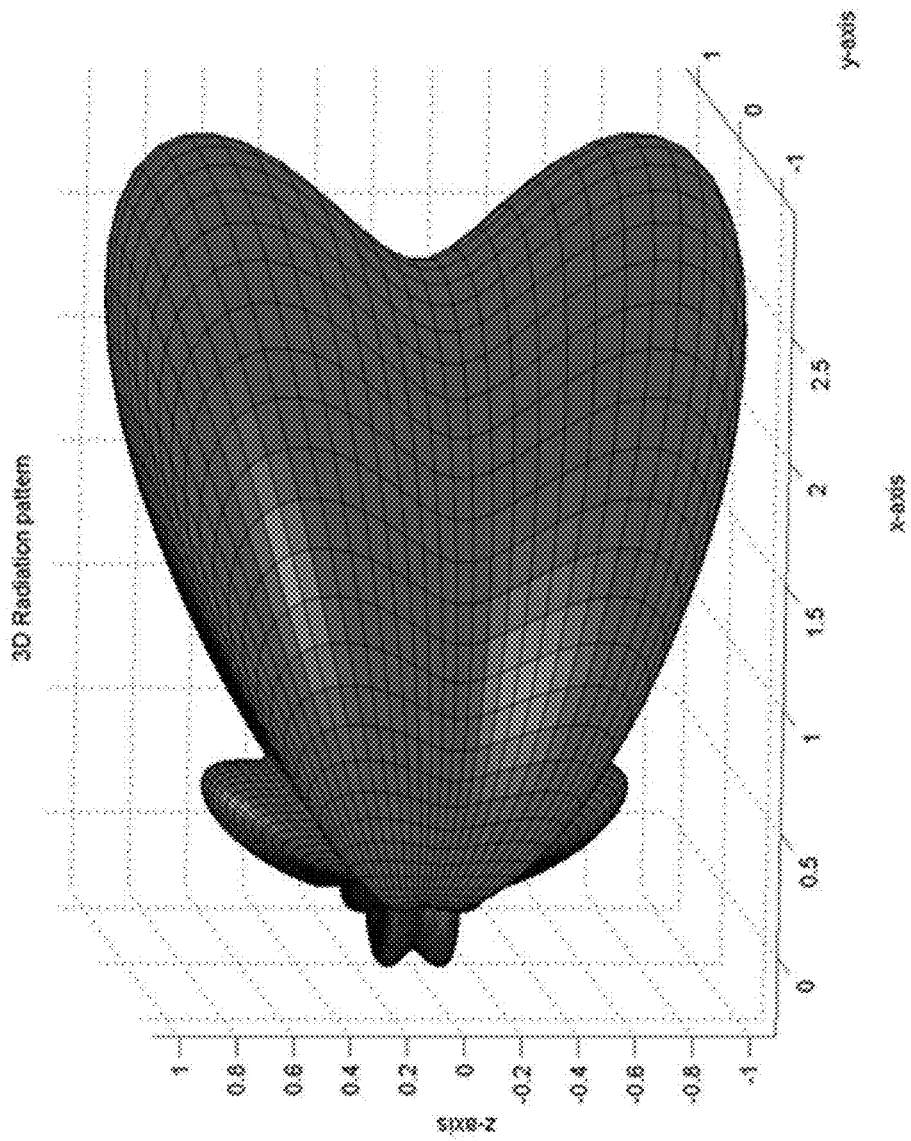

FIGS. 11A through 11P show the radiation patterns for four equally spaced ($\lambda/2$ separation) transmit antennas with the same polarization in three dimensions for rank=1. FIGS. 11A through 11P illustrate the radiation patterns for PMI 0 through PMI 15 from Table 2 above, respectively. It can be seen that some of these radiation patterns will emit signals in multiple directions. Hence, if the UE 32 in the macro cell 22 were to recommend these PMIs and the macro base station 20 were to schedule the UE 32 with these PMIs, the probability of co-channel interference to the UEs that are connected to the LPN 24 in the cell range expansion zone 28 is very high. Hence, according to some embodiments of the present disclosure, this problem is avoided by restricting the UE 32 from recommending these PMIs by codebook subset restriction. For example, in the four transmit antenna case, the codebook subset restriction for the UE 32 restricts the use of PMIs 3, 9, 11, 12, 13, 14, 15, and 16. Hence, in the

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$$P_{PMI} = I_4 - \left(\frac{2u_{PMI}u_{PMI}^H}{\|u_{PMI}\|^2}\right),$$

one could obtain the precoding matrix $W_{PMI}$ for different ranks by selecting/permuting the appropriate columns of matrix $P_{PMI}$ for the considered PMI, as given in 3GPP TS 36.211.

TABLE 3

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — | codebook subset restriction bitmap, the indices corresponding to these PMIs are set to zero. This implies that the UE 32 should not consider these PMIs in reporting CSI. Note that while FIGS. 11A through 11P illustrate the radiation, or antenna, patterns for rank=1, it is straightforward to extend these ideas to other ranks. Note that FIGS. 11A and 11P illustrate radiation patterns for co-polarized antennas for illustrative purposes only. However the same principle is equally applicable to cross polarization.

Figure 12:
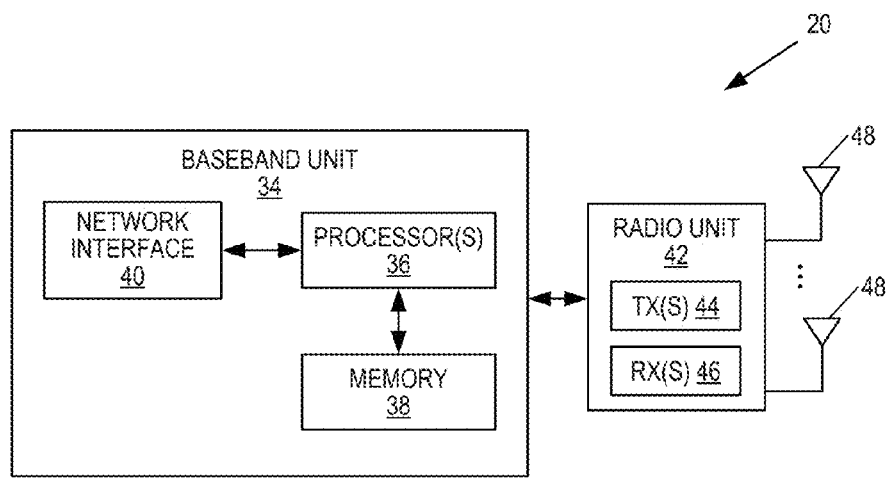
FIG. 12 is a block diagram of a base station according to some embodiments of the present disclosure.

FIG. 12 is a block diagram of the macro base station 20 according to some embodiments of the present disclosure. As illustrated, the macro base station 20 includes a baseband unit 34 including at least one processor 36 (also referred to as a processor circuit or processor circuitry) (e.g., microprocessor(s), Central Processing Unit(s) (CPU(s)), Application Specific Integrated Circuit(s) (ASIC(s)), Field Programmable Gate Array(s) (FPGA(s)), or the like), memory 38, and a network interface 40 as well as a radio unit 42 including one or more transmitters 44 and one or more receivers 46 coupled to multiple antennas 48. In some embodiments, the functionality of the macro base station 20 is implemented in software and stored in the memory 38. This software is executable by the processor(s) 36, whereby the macro base station 20 operates according to any of the embodiments described herein.

In some embodiments, a computer program including instructions which, when executed by at least one processor, causes the at least one processor to carry out the functionality of the macro base station 20 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 38).

Figure 13:
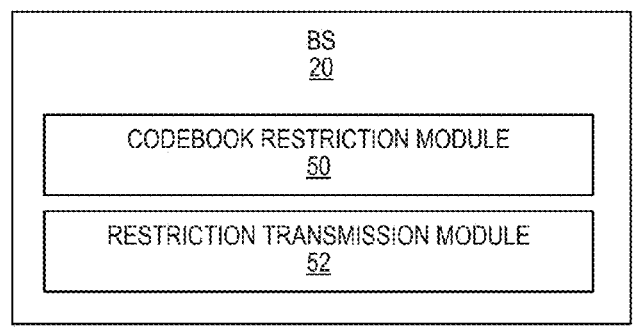
FIG. 13 is a block diagram of a base station according to some other embodiments of the present disclosure.

FIG. 13 is a block diagram of the macro base station 20 according to other embodiments of the present disclosure. The macro base station 20 includes a codebook restriction module 50 and a restriction transmission module 52, each of which is implemented in software. The codebook restriction module 50 determines a codebook restriction for, e.g., the UE 32 based on the location of the UE 32 within the macro/serving cell 22, as described above. The restriction transmission module 52 operates to communicate the codebook restriction to the UE 32 via an associated transmitter(s) of the macro base station 20 (not shown), as described above.

Figure 14:
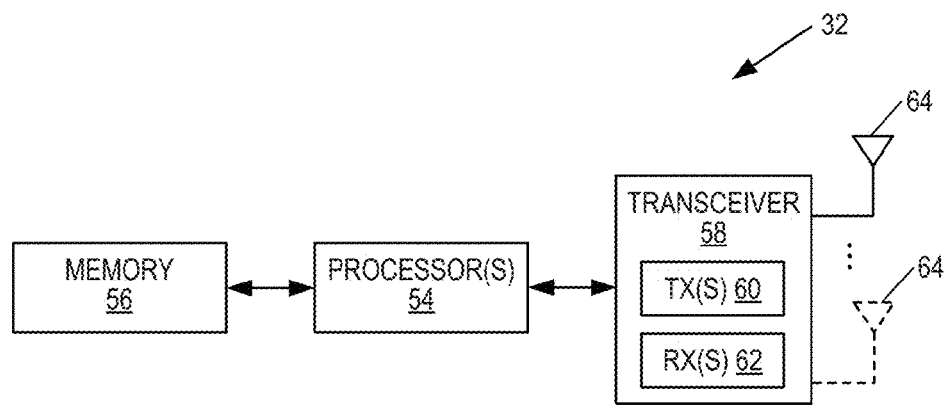
FIG. 14 is a block diagram of a UE according to some embodiments of the present disclosure.

FIG. 14 is a block diagram of the UE 32 according to some embodiments of the present disclosure. As illustrated, the UE 32 includes at least one processor 54 (also referred to as a processor circuit or processor circuitry) (e.g., microprocessor(s), CPU(s), ASIC(s), FPGA(s), or the like), memory 56, and a transceiver 58 including one or more transmitters 60 and one or more receivers 62 coupled to at least one antenna 64. In some embodiments, there is more than one antenna 64 (e.g., four antennas for 4×4 MIMO). In some embodiments, the functionality of the UE 32 is implemented in software and stored in the memory 56. This software is executable by the processor(s) 54, whereby the UE 32 operates according to any of the embodiments described herein.

In some embodiments, a computer program including instructions which, when executed by at least one processor, causes the at least one processor to carry out the functionality of the UE 32 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

Figure 15:
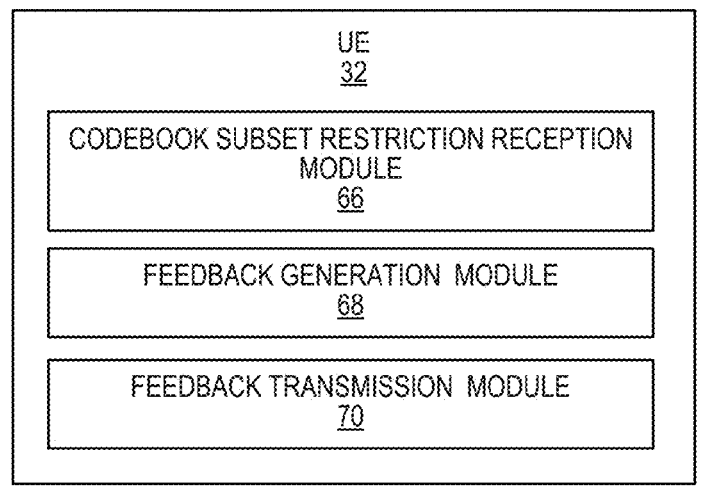
FIG. 15 is a block diagram of a UE according to some other embodiments of the present disclosure.

FIG. 15 is a block diagram of the UE 32 according to other embodiments of the present disclosure. As illustrated, the UE 32 includes a codebook subset restriction reception module 66, a feedback generation module 68, and a feedback transmission module 70, each of which is implemented in software. The codebook subset restriction reception module 66 operates to receive an indication of a codebook subset restriction for the UE 32 via an associated receiver(s) of the UE 32 (not shown), as described above. The feedback generation module 68 operates to generate a feedback report (e.g., a CSI report) using the reduced codebook. The feedback transmission module 70 operates to transmit the generated feedback to the serving base station (e.g., the macro base station 20) via an associated transmitter(s) of the UE 32 (not shown).

The following acronyms are used throughout this disclosure.

3GPP 3$^{rd}$ Generation Partnership Project
AP Access Point
ASIC Application Specific Integrated Circuit
BTS Base Transceiver Station
CIO Cell Individual Offset
CPU Central Processing Unit
CQI Channel Quality Information
CSI Channel State Information
DAS Distributed Antenna System
dBm Decibel-Milliwatt
E-SMLC Evolved Serving Mobile Location Centre
eNB Enhanced or Evolved Node B
FDD Frequency Division Duplexing
FPGA Field Programmable Gate Array
GPS Global Positioning System
GSM Global System for Mobile Communications
HPN High Power Node
HSPDA High Speed Downlink Packet Access
HSPA High Speed Packet Access
LEE Laptop Embedded Equipment
LME Laptop Mounted Equipment
LPN Low Power Node
LSB Least Significant Bit
LTE Long Term Evolution
LTE-A Long Term Evolution Advanced
Mbps Megabits per Second
MDT Minimization of Drive Tests
MIMO Multiple Input Multiple Output
MME Mobility Management Entity
MSB Most Significant Bit
MSC Mobile Switching Centre
MSR Multi-Standard Radio
NB Node B
NCL Neighbor Cell List
NTBP Number of Transport Block Preferred
O&M Operations and Maintenance
OSS Operations Support System
PCI Precoding Control Index
PDA Personal Digital Assistant
PMI Precoding Matrix Indicator
RAN Radio Access Network
RI Rank Indicator
RNC Radio Network Controller
RRH Remote Radio Head
RRU Remote Radio Unit
RSRP Reference Signal Received Power
SINR Signal to Interference plus Noise Ratio
SM Spatial Multiplexing
SON Self-Optimizing Network
TDD Time Division Duplexing
TS Technical Specification
UE User Equipment
USB Universal Serial Bus
UTRA Universal Terrestrial Radio Access
W Watt
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network, comprising:
    determining a codebook subset restriction for a wireless device based on a location of the wireless device within a serving cell of the wireless device, wherein determining the codebook subset restriction for the wireless device based on the location of the wireless device within the serving cell of the wireless device comprises:
        determining whether the wireless device is a cell edge wireless device based on the location of the wireless device within the serving cell of the wireless device; and if the wireless device is a cell edge wireless device, selecting the codebook subset restriction such that the codebook subset restriction is a predetermined codebook subset restriction that mitigates co-channel interference to other wireless devices; and sending an indication of the codebook subset restriction to the wireless device;

wherein the codebook subset restriction is dynamic.

2. The method of claim 1 wherein:

the other wireless devices to which the codebook subset restriction mitigates co-channel interference comprise wireless devices in a cell range expansion area of a low power node.

3. The method of claim 2 wherein the other wireless devices to which the codebook subset restriction mitigates co-channel interference further comprise cell edge wireless devices.

4. The method of claim 1 wherein determining the codebook subset restriction for the wireless device based on the location of the wireless device within the serving cell of the wireless device further comprises using no codebook subset restriction if the wireless device is not a cell edge wireless device.

5. The method of claim 1 wherein selecting the codebook subset restriction that mitigates co-channel interference to other wireless devices as the codebook subset restriction for the wireless device comprises selecting the codebook subset restriction that mitigates co-channel interference to other wireless devices based on one or more dynamic criteria.

6. The method of claim 5 wherein the one or more dynamic criteria comprise at least one of a group consisting of: which transmit antennas are active for downlink transmission in the serving cell of the wireless device and the location of the wireless device within the serving cell of the wireless device.

7. The method of claim 1 further comprising determining the location of the wireless device within the serving cell of the wireless device based on at least one of a group consisting of: measurements from a positioning system, one or more Channel Quality Information, CQI, reports from the wireless device, one or more mobility measurement reports from the wireless device, and a size of a neighbor cell list for the wireless device.

8. The method of claim 1 wherein the cellular communications network is a Long Term Evolution, LTE, network.

9. The method of claim 1 wherein the cellular communications network is a High Speed Packet Access, HSPA, network.

10. The method of claim 1 wherein the network node is a base station controlling the serving cell of the wireless device.

11. A network node for operation in a cellular communications network, comprising:

one or more processors; and memory containing instructions executable by the one or more processors whereby the network node is operative to:

determine a codebook subset restriction for a wireless device based on a location of the wireless device within a serving cell of the wireless device, wherein, in order to determine the codebook subset restriction for the wireless device based on the location of the wireless device within the serving cell of the wireless device, the network node is operative to:

determine whether the wireless device is a cell edge wireless device based on the location of the wireless device within the serving cell of the wireless device; and if the wireless device is a cell edge wireless device, select the codebook subset restriction such that the codebook subset restriction is a predetermined codebook subset restriction that mitigates co-channel interference to other wireless devices; and send an indication of the codebook subset restriction to the wireless device;

wherein the codebook subset restriction is dynamic.

12. The network node of claim 11 wherein:

the other wireless devices to which the codebook subset restriction mitigates co-channel interference comprise wireless devices in a cell range expansion area of a low power node.

13. The network node of claim 12 wherein the other wireless devices to which the codebook subset restriction mitigates co-channel interference further comprise cell edge wireless devices.

14. The network node of claim 11 wherein, in order to determine the codebook subset restriction for the wireless device based on the location of the wireless device within the serving cell of the wireless device, the network node is further operative to use no codebook subset restriction if the wireless device is not a cell edge wireless device.

15. The network node of claim 11 wherein the wireless device selects the codebook subset restriction that mitigates co-channel interference to other wireless devices based on one or more dynamic criteria.

16. The network node of claim 15 wherein the one or more dynamic criteria comprise at least one of a group consisting of: which transmit antennas are active for downlink transmission in the serving cell of the wireless device and the location of the wireless device within the serving cell of the wireless device.

17. The network node of claim 11 wherein the cellular communications network is one of a group consisting of: a Long Term Evolution, LTE, network and a High Speed Packet Access, HSPA, network.

18. The network node of claim 11 wherein the network node is a base station controlling the serving cell of the wireless device.

* * * * *